(12) United States Patent
Zaremba et al.

(10) Patent No.: US 11,407,451 B1
(45) Date of Patent: Aug. 9, 2022

(54) CANOPY FOR LIGHTWEIGHT VEHICLE

(71) Applicant: Textron Inc., Providence, RI (US)

(72) Inventors: Matthew James Zaremba, Evans, GA (US); Jacob Rutledge Kuglar, Martinez, GA (US); Stephen Christopher Campbell, Augusta, GA (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 17/182,610

(22) Filed: Feb. 23, 2021

(51) Int. Cl.
    *B62D 25/07* (2006.01)

(52) U.S. Cl.
    CPC .................... *B62D 25/07* (2013.01)

(58) Field of Classification Search
    CPC .. B62D 25/07; B62D 25/06; B60J 7/08; B60J 7/0084
    USPC ......................................... 296/213, 210, 208
    See application file for complete search history.

(56) References Cited

U.S. PATENT DOCUMENTS

| | | | | |
|---|---|---|---|---|
| 1,640,592 A | * | 8/1927 | Bourgon | B62D 25/06 296/211 |
| 2,911,179 A | * | 11/1959 | Hammerly | H02G 5/06 248/339 |
| 6,464,291 B2 | | 9/2002 | Hynds et al. | |
| 7,422,082 B2 | * | 9/2008 | Reffitt | B62D 23/005 296/193.07 |
| 7,585,010 B2 | * | 9/2009 | Hardy | B60N 2/012 296/213 |
| 10,005,348 B1 | * | 6/2018 | Zaremba | B60J 7/194 |
| 10,239,393 B2 | * | 3/2019 | Held | B60R 9/065 |
| 2002/0014790 A1 | * | 2/2002 | Hynds | B60J 7/08 296/213 |
| 2002/0174889 A1 | * | 11/2002 | Shugar | B60L 8/003 136/251 |
| 2003/0209918 A1 | * | 11/2003 | Cheek | B60J 7/106 296/1.02 |
| 2009/0108636 A1 | * | 4/2009 | Hanson | B62D 33/0625 296/213 |
| 2009/0167062 A1 | * | 7/2009 | Greif | B60J 7/0061 296/213 |
| 2013/0068810 A1 | * | 3/2013 | Garland | B60R 9/058 224/309 |

* cited by examiner

*Primary Examiner* — Jason S Morrow
*Assistant Examiner* — Wenwei Zhuo
(74) *Attorney, Agent, or Firm* — Sandberg Phoenix & von Gontard, PC

(57) ABSTRACT

A canopy for a lightweight vehicle comprising a canopy main panel mountable to a hollow front canopy downspout-strut. The main panel including a first water channel extending, a second water channel extending, a forward water channel integrally and fluidly connected to the first water channel and the second water channel. The main panel additionally including at least one water egress orifice formed in a bottom of an intermediate portion of the forward water channel, and a spout extending from a perimeter of each egress orifice, the spout integrally formed with and extending from an underside of the main panel, wherein each spout is structured and operable to extend into a water ingress opening in the front canopy downspout-strut of the vehicle when the canopy main panel is mounted to the front canopy downspout-strut.

22 Claims, 17 Drawing Sheets

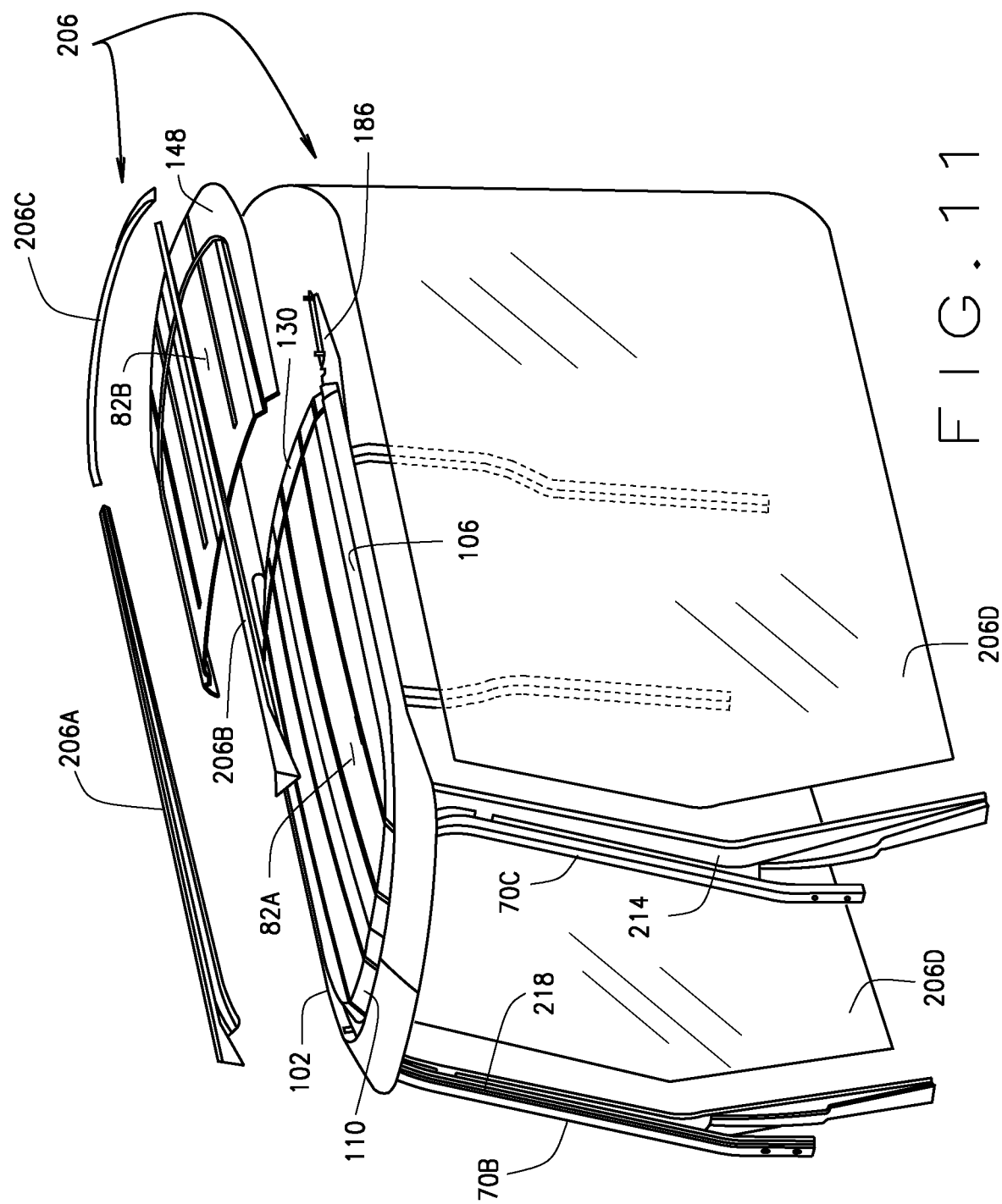

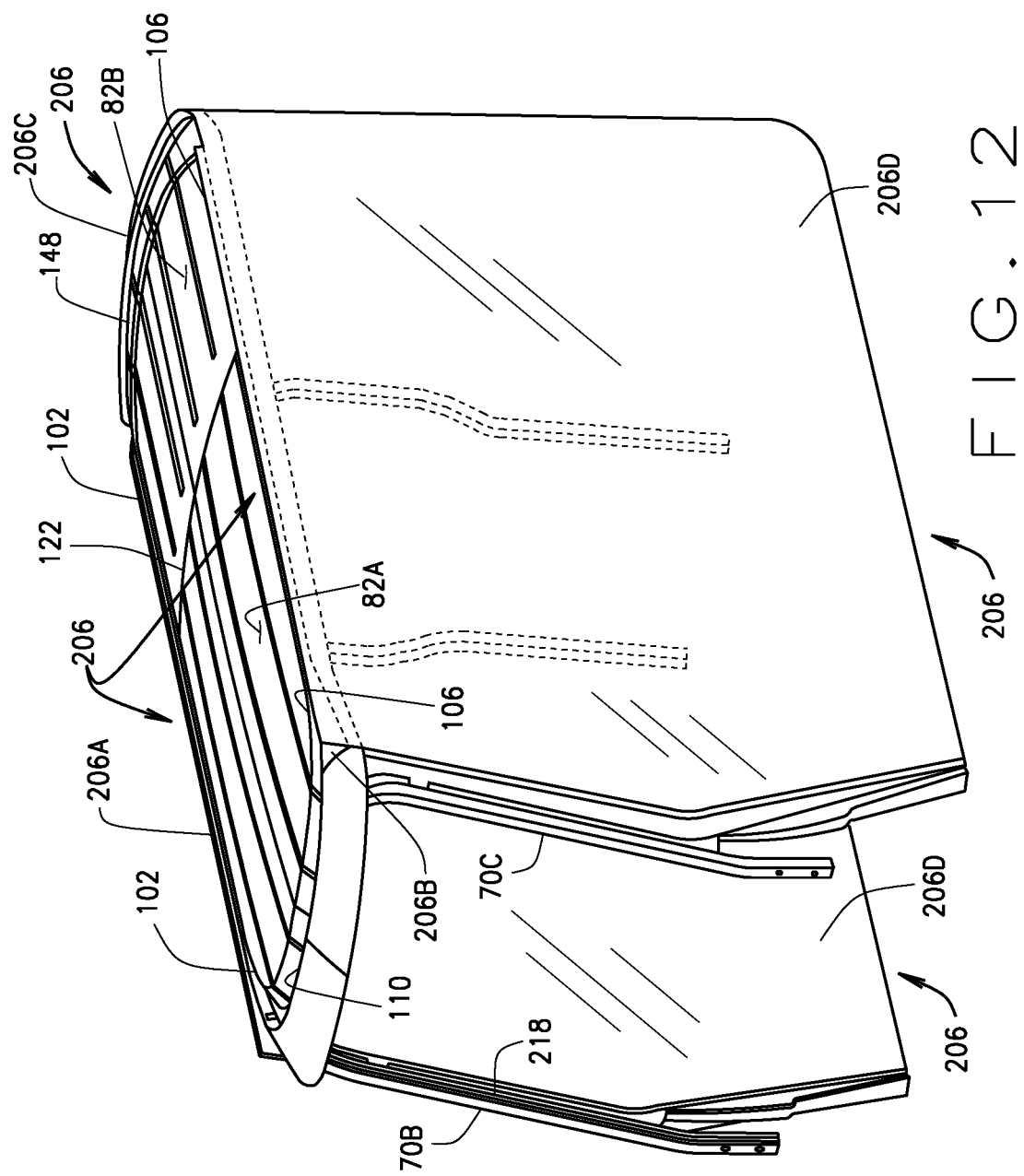

CANOPY FOR LIGHTWEIGHT VEHICLE

FIELD

The present teachings relate to lightweight vehicle canopies and more particularly to various features and supports structures thereof.

BACKGROUND

The statements in this section merely provide background information related to the present disclosure and may not constitute prior art.

Commonly, golf cars and other lightweight vehicles such as maintenance vehicles, cargo vehicles, shuttle/service vehicles, etc. have a standard length canopy (e.g., 50 to 58 inches in length) that covers the passenger compartment leaving vehicle structure located rearward of the passenger compartment uncovered. In various instances it is desirable to have a longer canopy that, in addition to covering the passenger compartment, will also cover the vehicle structure rearward of the main passenger seating structure that is structured and operable to provide seating for the vehicle operator and a passenger. For example, in various instances it is desirable to have a longer canopy that will cover a second row passenger seating structure (e.g., a rearward facing seating structure), a golf bag well (and golf bags disposed therein), at least a portion of a cargo bed, etc. For example, golf cars are often repurposed for use in consumer applications as lightweight personal transportation vehicles, wherein the vehicles are modified by adding rear seats to accommodate additional passengers. In such instances, the old existing (standard length) canopy and corresponding support struts are removed and discarded and replaced with a new longer increased length canopy (e.g., 76 to 84 inches, or longer, in length) that is supported by new and additional struts that must be mounted to the vehicle body and/or framework.

However, in many instances such increased length canopies are significantly more expensive and of lesser quality than the standard canopies. Lesser quality in this case is characterized by the lack of strength, propensity to deform and warp, and lack of consistent manufacturing tolerances that make it difficult to achieve desired fit, finish, and durability.

Additionally, many known canopies have poor water management performance in rainy conditions. Most know canopies have a rounded shape and lack adequate water drains resulting in water dripping onto occupants in seated in the passenger compartment.

Furthermore, strut mounted accessories such as mirrors, speakers, windshields and other types of accessories for such vehicles are often difficult to install and mount to the canopy struts often have poor fit and finish. For example, in many instances drilling holes in the canopy struts is often required, electrical wiring is exposed, and the quality of fastening is poor such that the accessory rattles, moves and/or does not stay in place.

Still further, often it is desirable to equip such vehicles with a passenger compartment enclosure to provide the passenger compartment with protection from environmental elements such as rain, snow, wind, etc. such enclosures are typically soft enclosures made from a flexible material such as canvas, plastic, cloth, etch. However, often such soft enclosures have a poor fit and finish and difficult and time consuming to install.

SUMMARY

The present disclosure provides vehicle canopy system that addresses the above mentioned shortcomings of the known vehicle canopies.

In various embodiments, the present disclosure provides a canopy for a lightweight vehicle comprising a canopy main panel mountable to a hollow front canopy downspout-strut. The main panel including a first water channel extending, a second water channel extending, a forward water channel integrally and fluidly connected to the first water channel and the second water channel. The main panel additionally including at least one water egress orifice formed in a bottom of an intermediate portion of the forward water channel, and a spout extending from a perimeter of each egress orifice, the spout integrally formed with and extending from an underside of the main panel, wherein each spout is structured and operable to extend into a water ingress opening in the front canopy downspout-strut of the vehicle when the canopy main panel is mounted to the front canopy downspout-strut.

In various other embodiments, the present disclosure provides a canopy system for a lightweight vehicle, wherein the canopy system comprising a hollow front canopy downspout-strut. The hollow front canopy downspout-strut comprises a header having at least one water ingress opening in a connection face of the header such that the water ingress opening is fluidly connected with an internal lumen of the front canopy downspout-strut. The hollow front canopy downspout-strut additionally comprises a first downspout leg extending from a first end of the header and mountable to at least a first portion of a body of the vehicle such that a distal end of the first leg is directed away from a passenger compartment of the vehicle, and a second downspout leg extending from a second end of the header and mountable to at least a second portion of a body of the vehicle such that a distal end of the second leg is directed away from the passenger compartment of the vehicle. The canopy system further comprises a canopy comprising a canopy main panel mountable to the front canopy downspout-strut. In various instances, the main panel comprises a first main longitudinal water channel extending along a first longitudinal edge portion of the canopy main panel, a second main longitudinal water channel extending along a second longitudinal edge portion of the canopy main panel, and a forward lateral water channel extending along a forward lateral edge portion of the canopy main panel and integrally and fluidly connected to a forward end of the first main longitudinal water channel and a forward end of the second main longitudinal water channel. The main panel additionally comprises at least one water egress orifice formed in a bottom of an intermediate portion of the forward lateral water channel, and at least one spout extending from a perimeter of the at least one egress orifice, the at least one spout integrally formed with and extending from an underside of the canopy main panel. The at least one spout is structured and operable to extend into the water ingress opening in the header of the front canopy downspout-strut of the vehicle when the canopy main panel is mounted to the front canopy downspout-strut such that water flowing through the forward lateral water channel will flow through the at least one water egress orifice and into the internal lumen of the front canopy downspout-strut header whereafter the water will through the first and second downspout legs and be discharged from the distal ends thereof.

In yet other various embodiments, the present disclosure provides a lightweight vehicle, wherein the vehicle comprises a chassis, a body mounted to the chassis, and a passenger compartment supported by the chassis. The passenger compartment includes a dash console, a floorboard, and a passenger seating structure. The vehicle additionally includes a canopy system mounted to the body and disposed above at least the passenger compartment, wherein the canopy system includes a hollow front canopy downspout-strut comprising a header having at least one water ingress opening in a connection face of the header such that the water ingress opening is fluidly connected with an internal lumen of the front canopy downspout-strut. The hollow front canopy downspout-strut additionally includes a first downspout leg extending from a first end of the header and mountable to a first portion of the body such that a distal end of the first leg is directed away from the passenger compartment, and a second downspout leg extending from a second end of the header and mountable to a second portion of a body such that a distal end of the second leg is directed away from the passenger compartment. The canopy system additionally includes a canopy, wherein the canopy comprises a canopy main panel mountable to the front canopy downspout-strut. The main panel comprises a first main longitudinal water channel extending along a first longitudinal edge portion of the canopy main panel, a second main longitudinal water channel extending along a second longitudinal edge portion of the canopy main panel, and a forward lateral water channel extending along a forward lateral edge portion of the canopy main panel and integrally and fluidly connected to a forward end of the first main longitudinal water channel and a forward end of the second main longitudinal water channel. The canopy main panel further comprises at least one water egress orifice formed in a bottom of an intermediate portion of the forward lateral water channel, and at least one spout extending from a perimeter of the at least one egress orifice, such that the at least one spout is integrally formed with and extending from an underside of the canopy main panel. The at least one spout is structured and operable to extend into the water ingress opening in the header of the front canopy downspout-strut of the vehicle when the canopy main panel is mounted to the front canopy downspout-strut such that water flowing through the forward lateral water channel will flow through the at least one water egress orifice and into the internal lumen of the front canopy downspout-strut header whereafter the water will through the first and second downspout legs and be discharged from the distal ends thereof.

While the present disclosure is primarily directed generically to lightweight vehicles, it should be understood that the canopy system disclosed herein can have application to all types of lightweight vehicles that are not designated for use on roadways, e.g., golf cars, maintenance vehicles, cargo vehicles, shuttle vehicles, worksite vehicles, etc.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 11 is an exploded isometric view of the water channel and downspout canopy system shown in FIGS. 1 through 10 including an enclosure assembly, in accordance with various embodiments of the present disclosure.

Figure 12A:
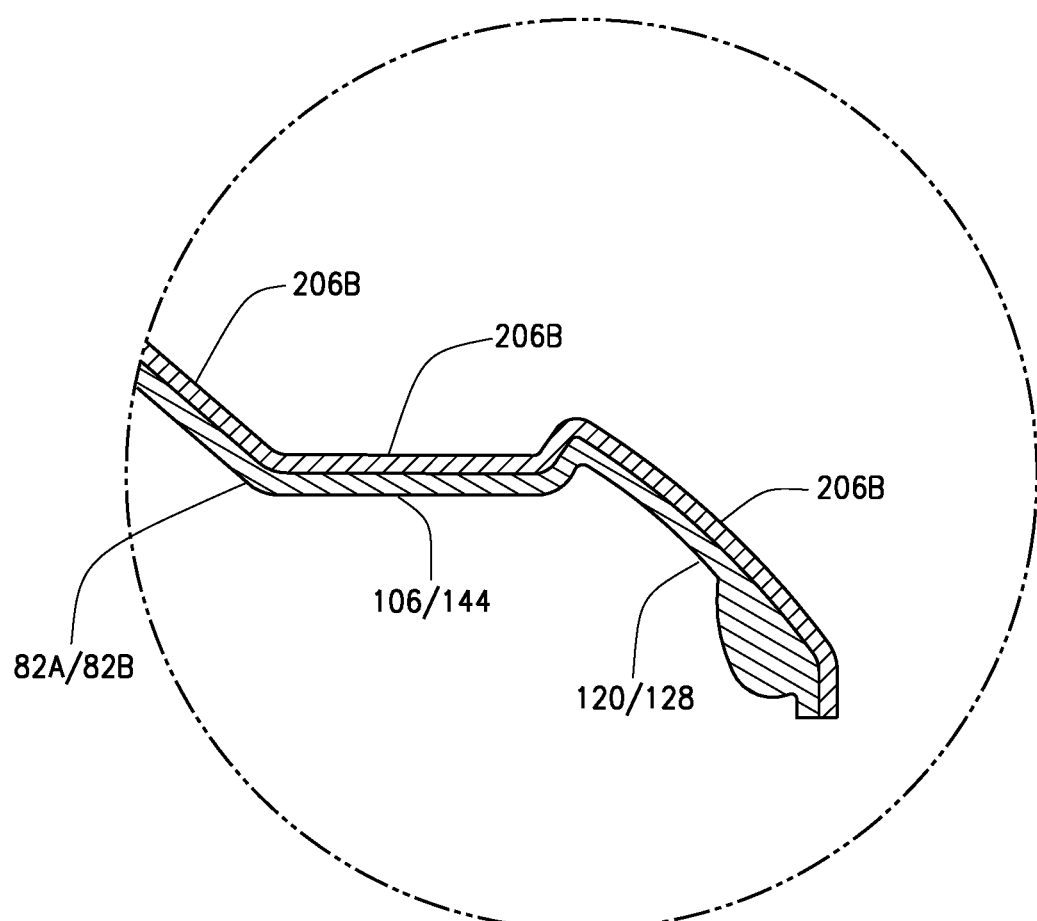
FIG. 12 is an isometric view of the water channel and downspout canopy system including an enclosure assembly shown in FIG. 11, in accordance with various embodiments of the present disclosure.
Figure 13:
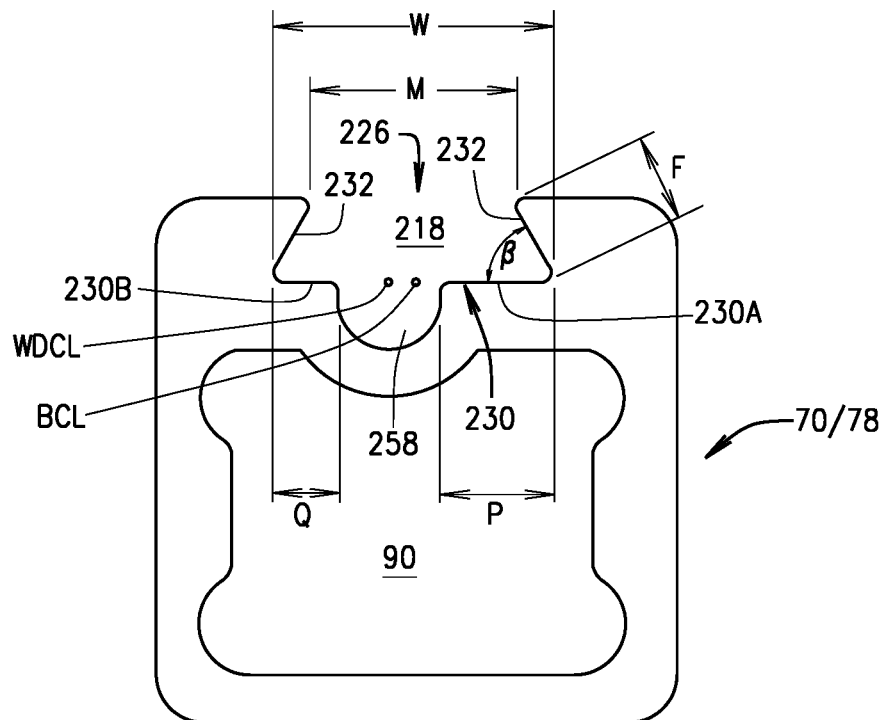

FIG. 12A is an illustration of lateral cross-section of each longitudinal water channel of the water channel and downspout canopy system shown in shown in FIGS. 1-12 having an enclosure mounting rail of the enclosure assembly disposed and/or mounted therein, and exemplarily illustrating how a lateral cross-sectional shape or profile of the mounting rail is substantially the same as the lateral cross-sectional shape or profile of the longitudinal water channels, in accordance with various embodiments of the present disclosure FIG. 13 is a cross-sectional view of a portion of a front canopy downspout-strut and or a rear strut of the water channel and downspout canopy system shown in FIGS. 1 through 12 comprising a dovetail accessory attachment channel, in accordance with various embodiments of the present disclosure.

Figure 14:
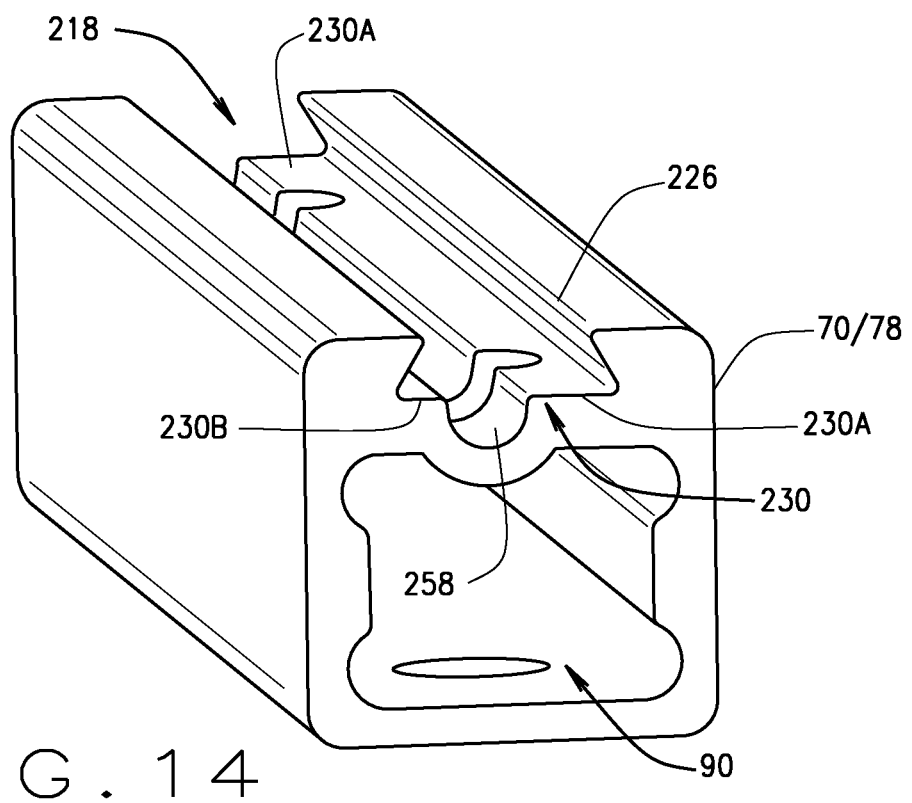

FIG. 14 is an isometric cross-sectional view of the portion of the front canopy downspout-strut and/or rear strut of the water channel and downspout canopy system shown in FIGS. 1 through 12 comprising the dovetail accessory attachment channel, in accordance with various embodiments of the present disclosure.

Figure 15:
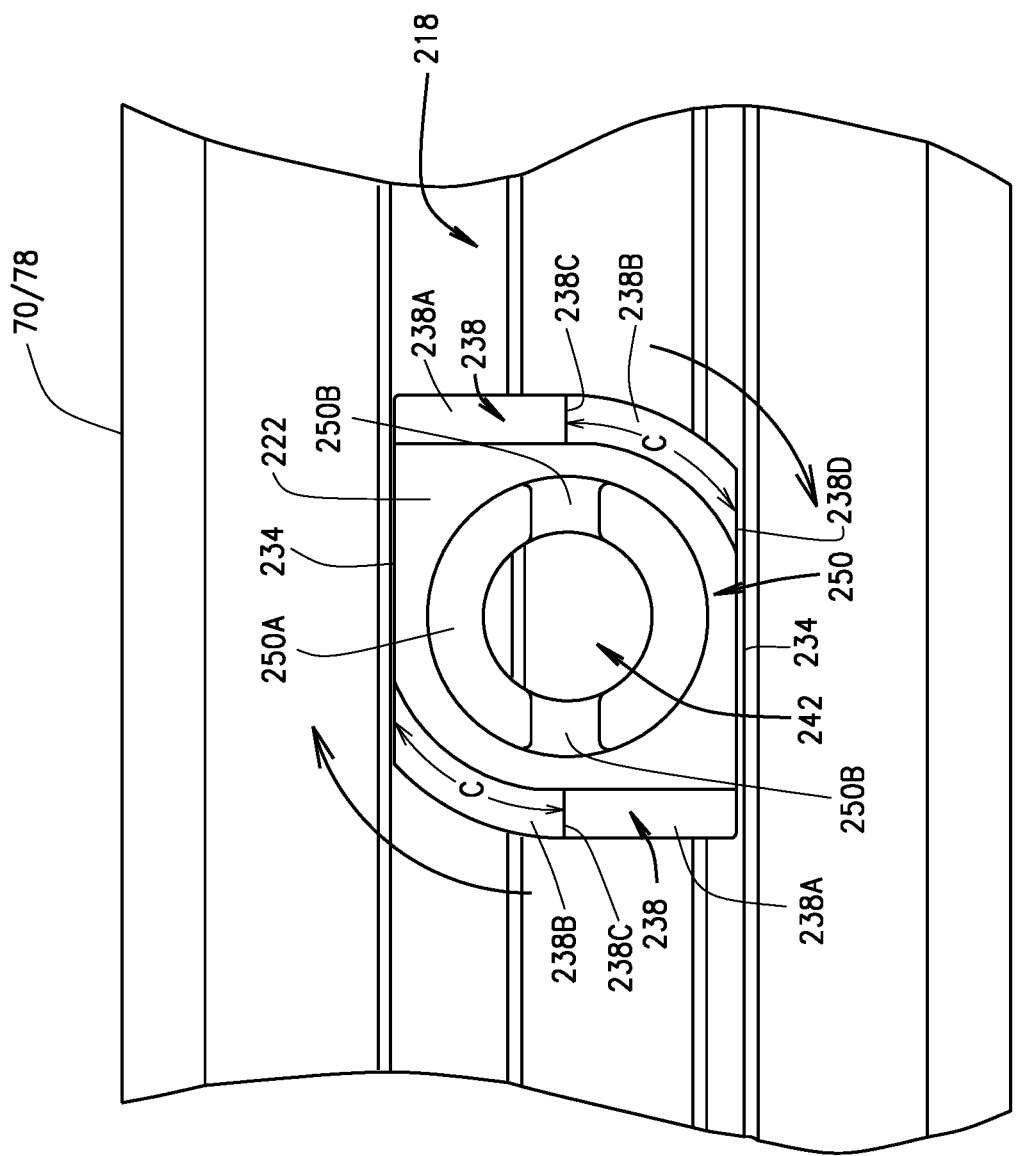

FIG. 15 is a top view of a section of the portion of the front canopy downspout-strut and/or rear strut of the water channel and downspout canopy system shown in FIGS. 1 through 12 comprising the dovetail accessory attachment channel with a chamfered edge pinch nut disposed within the dovetail accessory attachment channel, in accordance with various embodiments of the present disclosure.

Figure 16:
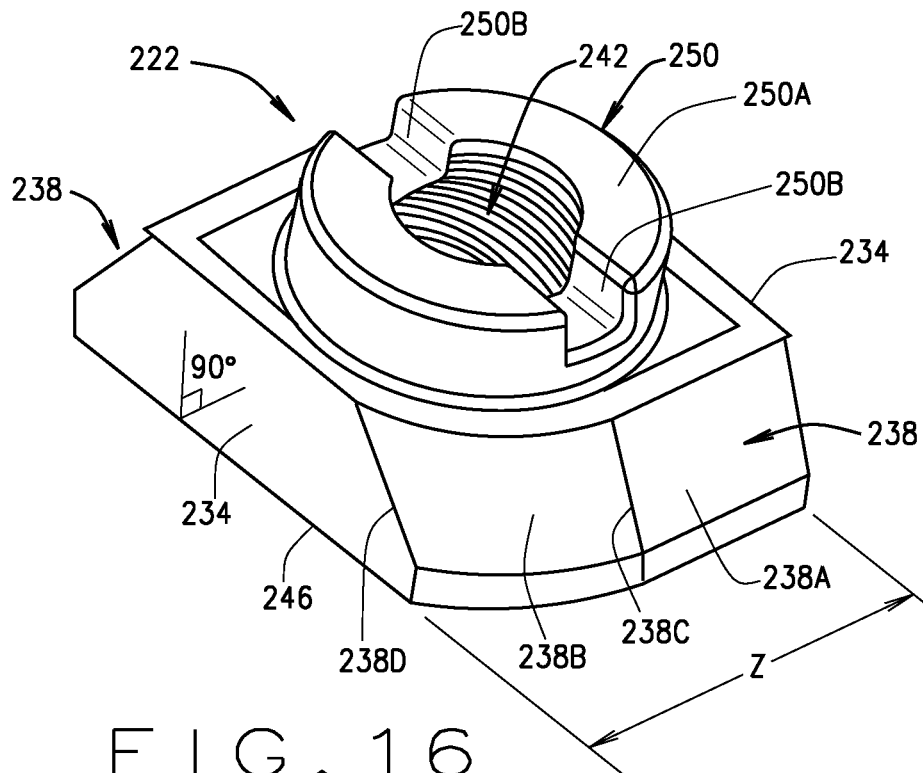

FIG. 16 is an view of the chamfered edge pinch nut disposed shown in FIG. 15, in accordance with various embodiments of the present disclosure.

Figure 17:
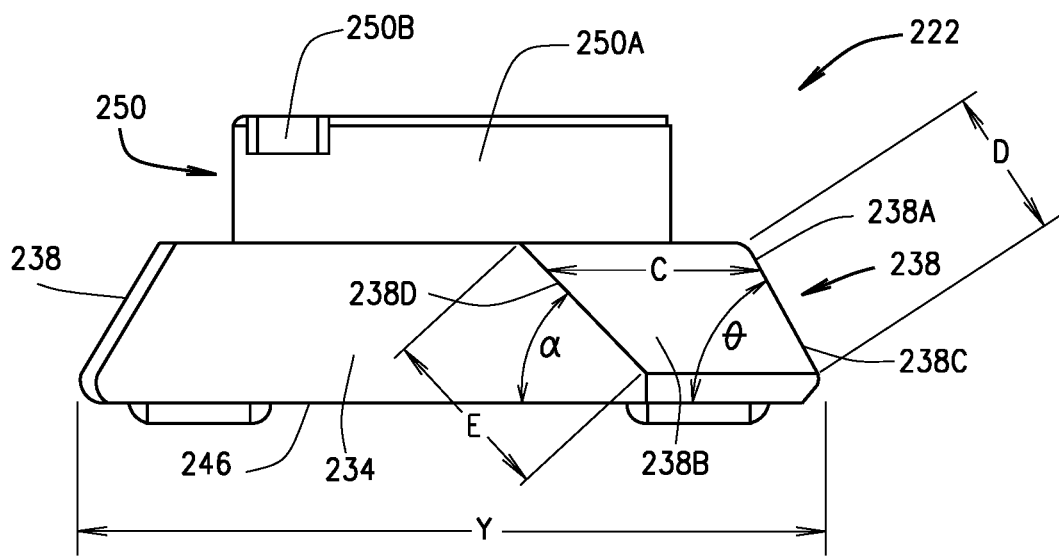

FIG. 17 is a side view of the chamfered edge pinch nut disposed shown in FIGS. 15 and 16, in accordance with various embodiments of the present disclosure.

Figure 18:
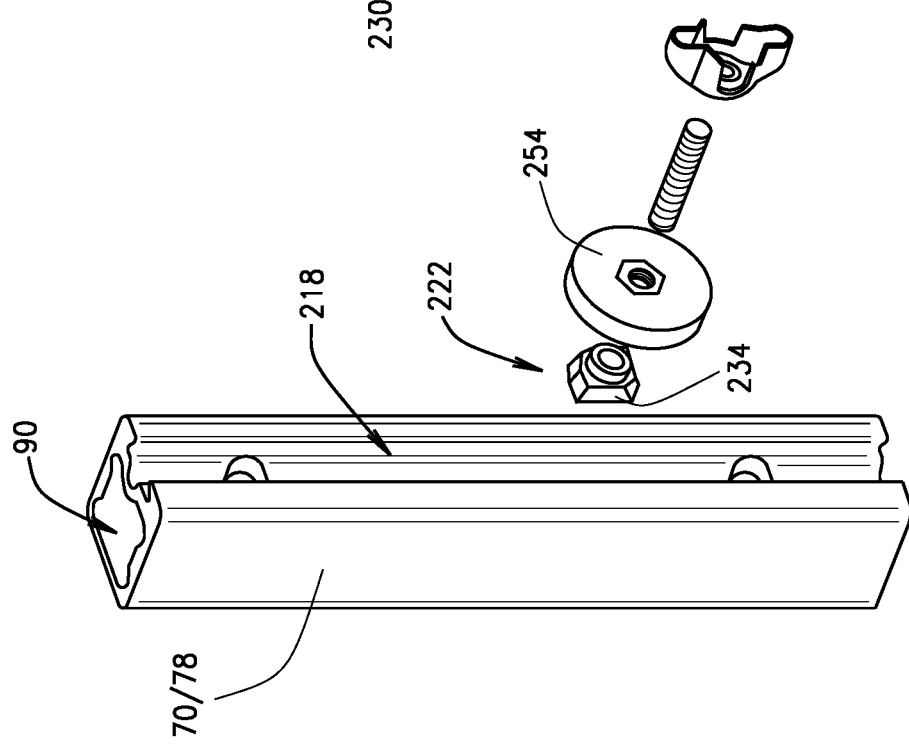

FIG. 18 is an exploded view of a section of the portion of the front canopy downspout-strut and/or rear strut with an accessory attached thereto utilizing the chamfered edge pinch nut, in accordance with various embodiments of the present disclosure.

Figure 19:
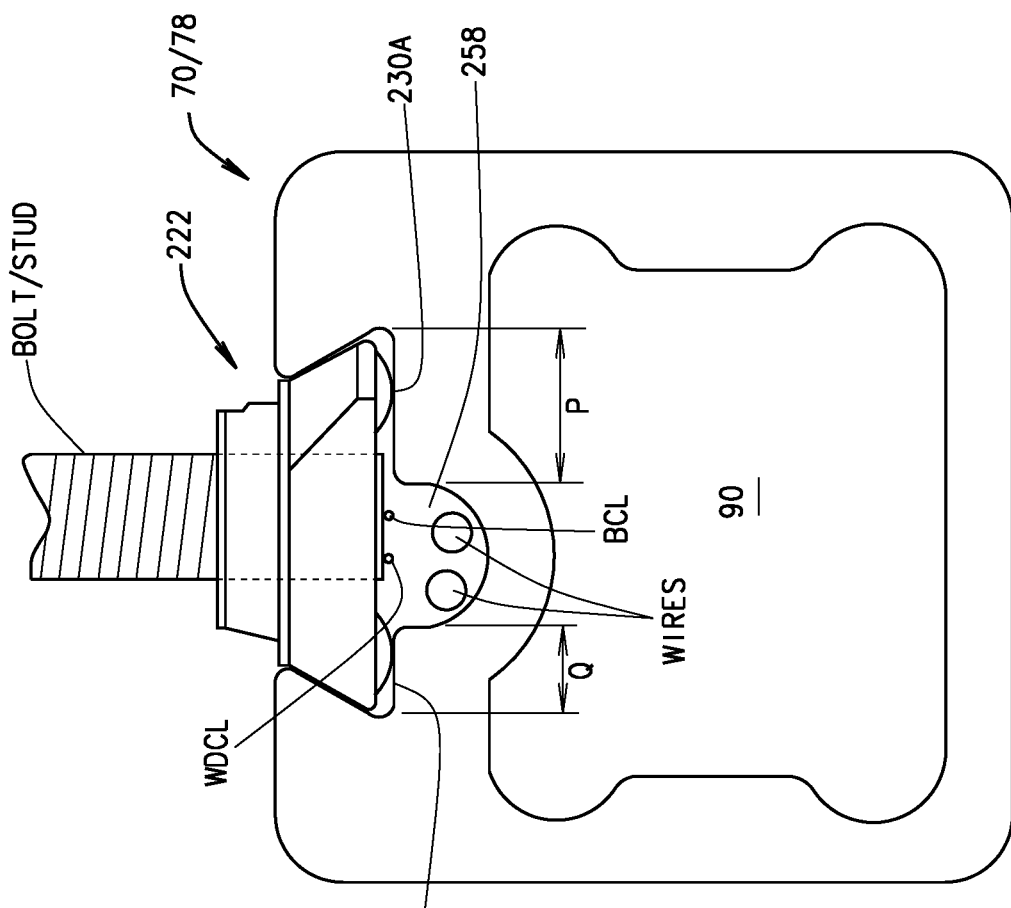

FIG. 19 is a cross-sectional view of the portion of the front canopy downspout-strut and/or rear strut of the water channel and downspout canopy system shown in FIGS. 1 through 18 illustrating an off-center wire duct and a bolt stop, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

As used herein, the word "forward" and the phrase "forward of" are used to describe the direction from a named component or structure toward the front of the disclosed vehicle. Similarly, as used herein, the word "rearward" and the phrase "rearward of" are used to describe the direction from a named component or structure toward the rear of the disclosed vehicle.

Figure 1:
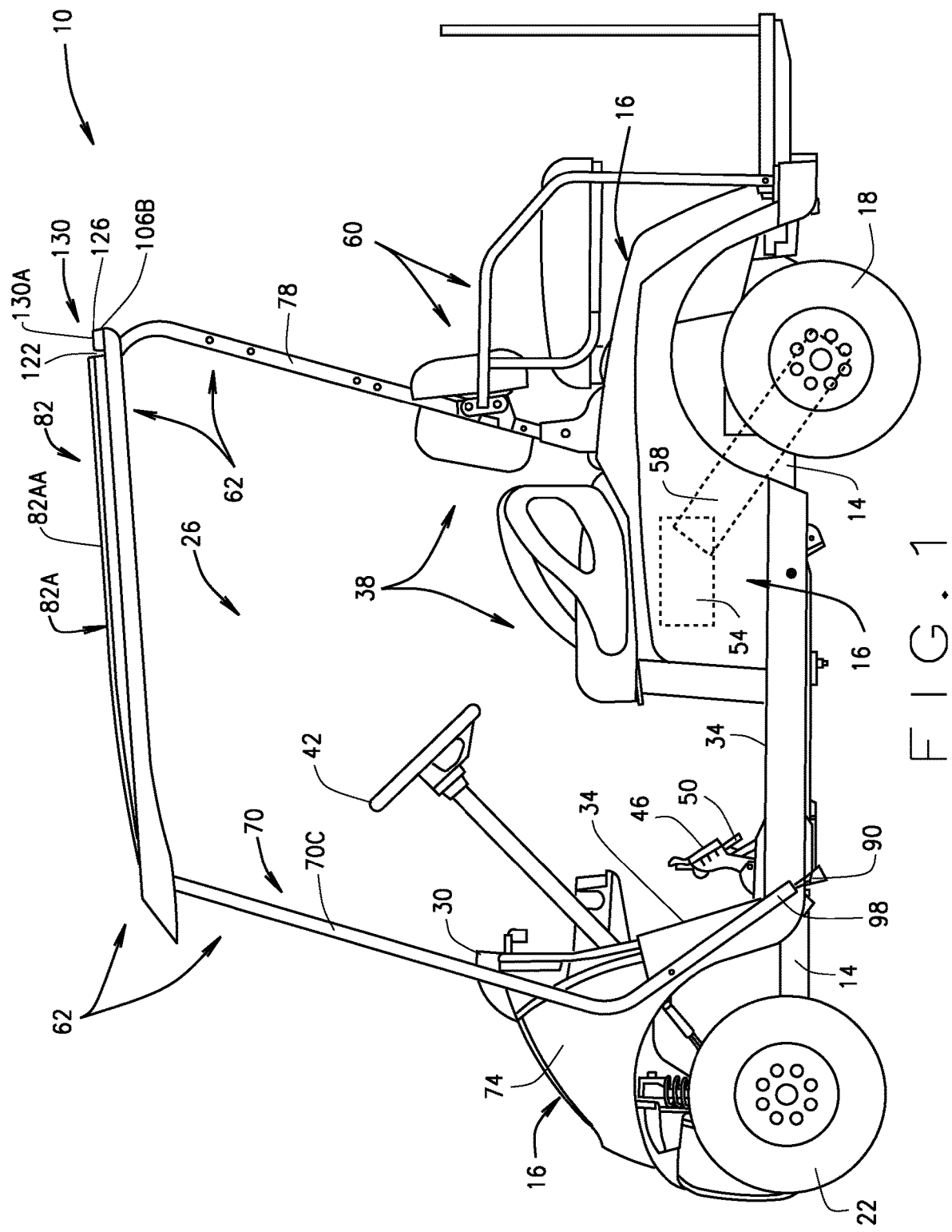
FIG. 1 is a side view of a low speed utility vehicle, exemplarily illustrated as passenger transport, comprising a water channel and downspout canopy system in accordance with various embodiments of the present disclosure.
Figure 2:
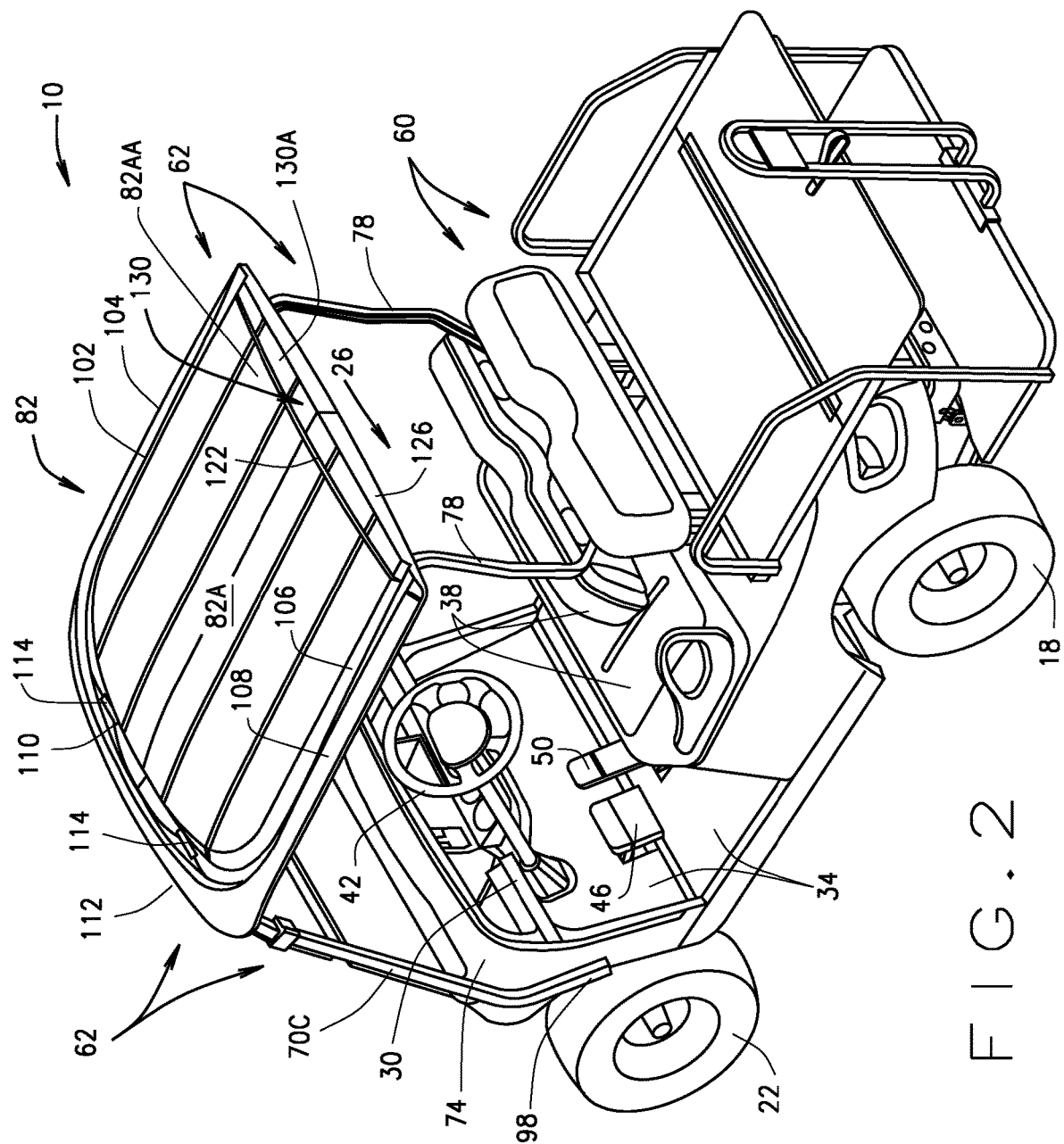
FIG. 2 is an isometric view of a low speed utility vehicle, exemplarily illustrated as a cargo vehicle, comprising the water channel and downspout canopy system shown in FIG. 1 in accordance with various embodiments of the present disclosure.
Figure 3:
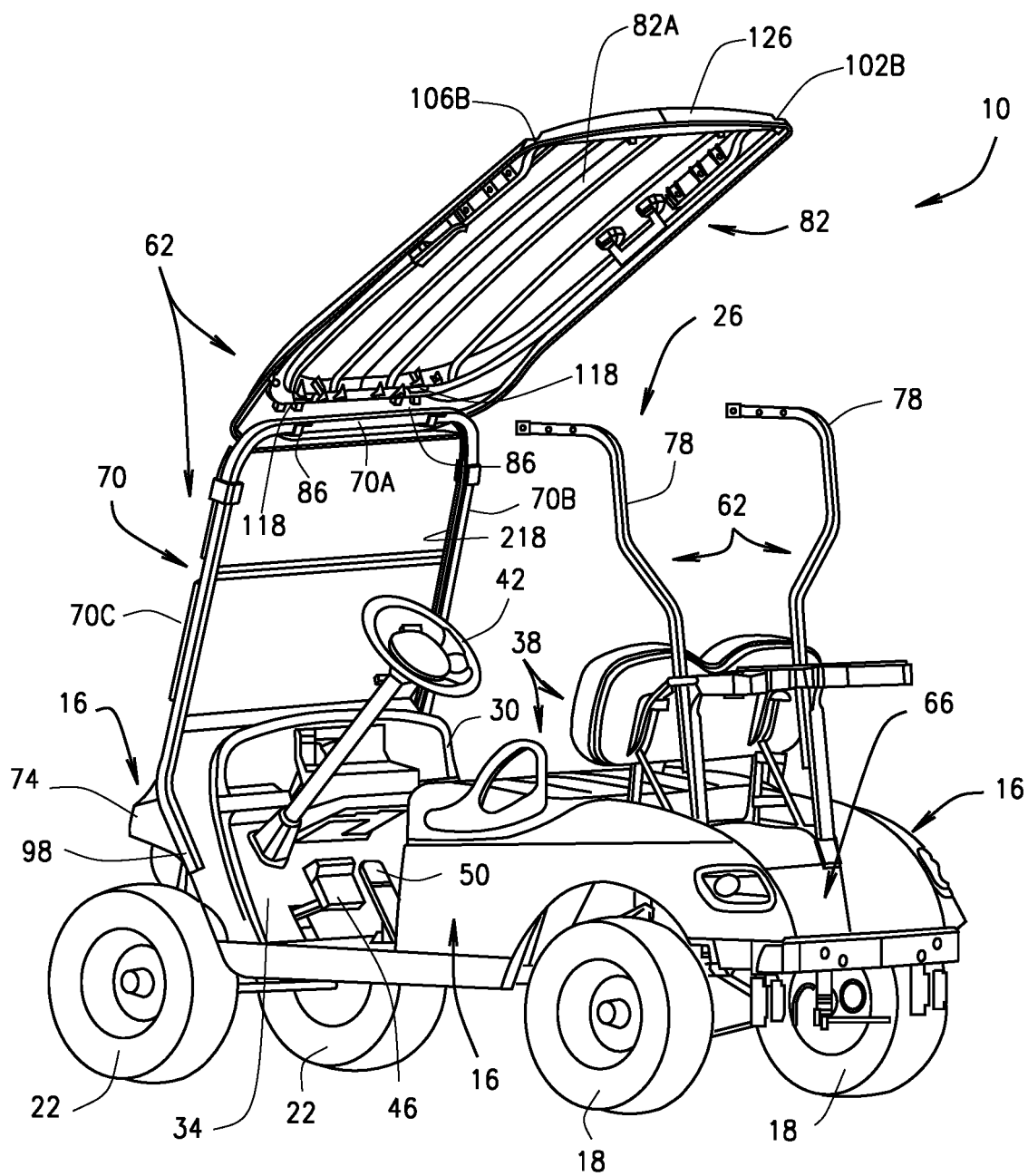
FIG. 3 is an isometric view of a low speed utility vehicle, exemplarily illustrated as a golf car, comprising the water channel and downspout canopy system shown in FIG. 1 in accordance with various embodiments of the present disclosure.

Referring to FIGS. 1, 2 and 3, in various embodiments, the present disclosure provides a lightweight vehicle 10 (e.g., a golf car) that generally includes a chassis or frame 14, a body 16 mounted to the chassis 14, a pair of rear wheels 18 and a pair of front wheels 22 operationally connected to the chassis 14, and a passenger compartment 26 defined by the body 16 and supported by the chassis 14. As used herein, the word "wheel(s)" will be understood to mean the structure consisting of the respective tire mounted on the respective wheel, also known as the rim or hub, particularly, the compilation of the tire and wheel/rim/hub. The passenger compartment 26 generally includes a dash console 30, a floorboard 34, and a main passenger seating structure 38 structured and operable to provide seating for one or more golf car occupants, e.g., a driver and one or more passengers. The dash console 30 can include one or more instrument displays, gauges, vehicle control devices and/or storage compartments. For example, in various instances the dash console 30 can include one or more of a vehicle On/Off key switch for controlling the operation mode of the vehicle 10, a forward/neutral/reverse selector, one or more small accessory storage pockets, one or more telemetry gauges/readouts (e.g., a speedometer, tachometer, temperature gauge, etc.) an electronic display (e.g., an LCD display that can have touch capabilities), a radio, and/or various other vehicle controls. The floorboard 34 is structured and operable to enclose a bottom of, and provide a floor for, the passenger compartment 26. The passenger compartment 26 additionally includes a steering wheel 42 for use by the operator to control the directional movement of the vehicle 10, a brake pedal 46 for use by the operator to control slowing and stopping of the vehicle 10, and an accelerator pedal 50 for use by the operator to control the torque delivered by a prime mover(s) 54 to one or more of the rear and/or front wheels 18 and/or 22.

As described above, the vehicle 10 includes a prime mover 54 operatively connected to a drivetrain 58 that is operatively connected to at least one of the rear and/or front wheels 18 and/or 22 (via a rear axle assembly not shown, but readily understood by one skilled in the art). The prime mover 54 can be any device that is structured and operable to generate torque (e.g., motive force, e.g., power) utilized to provide motive force for the vehicle 10 via the drivetrain 58. For example, the prime mover 54 can be an internal combustion engine (ICE), an electric motor, a hybrid combination of an ICE and an electric motor, or any other suitable motive power source and remain within the scope of the present disclosure. Although the drivetrain 58 of the present disclosure will, by way of example, will be shown and described herein as structured and operable to deliver motive force to the rear wheel(s) 18 (via the rear axle assembly not shown, but readily understood by one skilled in the art), it should be understood that, in various embodiments, the drivetrain 58 of the present disclosure can be structured and operable to deliver motive force to the front wheel(s) 22 (via a front axle assembly not shown, but readily understood by one skilled in the art), and remain within the scope of the present disclosure. In yet other embodiments, it is envisioned that drivetrain 58, as described herein can be implemented in a four-wheel drive vehicle operable to deliver motive force (i.e., power/torque) generated by the prime mover 54 to one or more of the front wheel(s) 22 and/or rear wheel(s) 18.

In various embodiment, the vehicle 10 can additionally include an auxiliary passenger seating structure 60 disposed rearward of the main passenger seating structure 38 and the passenger compartment 26 (FIG. 1). In various instances the auxiliary passenger seating structure 60 can be a convertible to cargo deck (FIG. 2). In various other embodiments, wherein the vehicle 10 is a golf car, the golf car 10 can include a bag well 66 disposed rearward of the main passenger seating structure 38 and the passenger compartment 26 (FIG. 3).

Referring now to FIGS. 1, 2, 3, 4 and 5, the vehicle 10 further includes a water channel and downspout canopy system 62 mounted to the vehicle body 16 and/or chassis 14 and disposed over and around the passenger compartment 26. The canopy system 62 is structured and operable to protect passengers of the vehicle 10 from rain, water and sun, and to channel or direct water or rain or other liquid away from the passenger as described below. In various embodiments the canopy system 65 comprises a hollow front canopy downspout-strut 70 that is mountable to a front cowl 74 and/or the chassis 14 and/or other forward structure of the vehicle 10, at least one rear canopy strut 78 that is mountable to a rear deck and/or chassis 14 and/or other rearward structure of the vehicle 10 (e.g., the passenger seating structure, a golf bag retention brace, etc.), and a canopy 82 mountable to the front downspout-strut 70 and the rear strut(s) 78. More particularly, in various embodiments, the hollow front canopy downspout-strut 70 comprises a header 70A, a first downspout leg 70B extending from, connected to and/or integrally formed with a first end of the header 70A, and a second downspout leg 70C extending from, connected to and/or integrally formed with a second end of the header 70A, and the canopy 82 comprises a canopy main panel 82A that is mountable to the front downspout-strut header 70A and the rear strut(s) 78. The canopy main panel 82A is mountable to the header 70A of the front canopy downspout-strut 70 using any suitable connection method, manner, means, device, system or mechanism (e.g., clamps, nut and bolts, screws, etc.)

As with the first and second downspout legs 70B and 70C, the front downspout-strut header 70A is also hollow. The front downspout-strut header 70A comprises at least one water ingress opening 86 formed in a canopy connection face 72 of the header 70A. The water ingress opening(s) 86 is/are open to and fluidly connected with an internal lumen 90 of the front canopy downspout-strut 70. More particularly, the internal lumen 90 extends through the entire front downspout-strut 70 (e.g., extends through the entire length of the header 70A and the entire length of the first and second downspout legs 70B and 70C) such that the water ingress opening(s) 86 is/are fluidly connected with open distal ends 94 and 98 of the first and second downspout legs 70B and 70C, respectively. The canopy main panel 82A is mounted to the front canopy downspout strut 70 and the rear canopy strut(s) 78 such that, when the vehicle 10 is disposed on substantially level ground, the canopy main panel 82A is angled forward such that the rear portion of the canopy main panel 82A is elevated with regard to, or disposed higher than, the front portion of the canopy main panel 82A and water will flow (via gravitational forces) will flow from the rear potion to the front portion of the canopy main panel 82A. Therefore, when the vehicle 10 is disposed such that at least a portion of the rear portion of the canopy main panel 82A is elevated with regard to, or disposed higher than, the front portion, water, rain or other liquid that falls on, lands on or is otherwise disposed on the canopy main panel 82A will shed or flow into a first and/or a second main longitudinal water channel 102 and/or 106, then flow forward within the first and/or second main longitudinal water channels 102 and/or 106 into the forward lateral water channel 110.

Subsequently, water flowing within the forward lateral water channel 110 will enter the front canopy downspout-strut internal lumen 90 via the water ingress opening(s) 86 and then flow through internal lumen 90 extending through the header top side 70 and the first and second downspout legs 70B and 70C and exit or discharge from the internal lumen 90 via the open distal ends 94 and 98 of the first and second downspout legs 70B and 70C. More specifically, the first downspout leg 70B extends from the first end of the header 70A and is mountable to the front cowl 74 and/or the chassis 14 and/or other forward structure of the vehicle 10 such that the distal end 94 directed away from the passenger compartment 26, thereby directing the water/rain//fluid away from any passenger sitting in the main seating structure 38. Similarly, the second downspout leg 70C extends from the second end of the header 70A and is mountable to the front cowl 74 and/or the chassis 14 and/or other forward structure of the vehicle 10 such that the distal end 98 is directed away from the passenger compartment 26, thereby directing the water/rain/fluid away from any passenger sitting in the main seating structure 38.

Moreover, the water ingress opening(s) 86 are disposed within an intermediate portion header 70A. As used herein, an intermediate portion of the header 70A will be understood to mean that the water ingress opening(s) 86 are formed in any portion of the header 70A that is inward from the corners of the front canopy downspout-strut 70 where the first and second downspout legs 70B and 70C join or merge into the header 70A, and toward a center line A of the header 70A. That is, the water ingress opening(s) 86 are not disposed above or in alignment with the portion of the internal lumen 90 that extends through the first and second downspout legs 70B and 70C. Rather, the water ingress opening(s) 86 open directly into the portion of the internal lumen 90 that is within the intermediate portion of the header 70A inward from the corners of the header 70A and toward the center line A. Hence, water or liquid entering the internal lumen 90 via the water ingress opening(s) 86 will not flow directly into the portion of the internal lumen 90 within the first and second downspout legs 70B and 70B, but rather will flow through the water ingress opening(s) 86 into the portion of the internal lumen 90 within the header 70A, then flow along the portion of the internal lumen 90 within the header 70A toward the corners of the front canopy downspout-strut 70, then flow into the portion of the internal lumen 90 within the first and second downspout legs 70B and 70B.

Referring now to FIGS. 1, 2, 3, 4, 5 and 6, in various embodiments, the canopy main panel 82A comprises the first main longitudinal water channel 102 recessed within and extending along a first longitudinal edge portion 104 of the canopy main panel 82A, and the second main longitudinal water channel 106 recessed within and extending along a second longitudinal edge portion 108 of the canopy main panel 82A. Additionally, an exterior wall of the first main longitudinal water channel 102 (i.e., a wall of the first main longitudinal water channel 102 that is furthest away from a centerline C) is formed by or defined by a first sidewall 116 of the canopy main panel 82A, and an exterior wall of the second main longitudinal water channel 106 (i.e., a wall of the second main longitudinal water channel 102 that is furthest away from a centerline C) is formed by or defined by a second sidewall 120 of the canopy main panel 82A. In such embodiments, the canopy main panel 82A further comprises a forward lateral water channel 110 recessed within and extending along a forward lateral edge portion 112 of the canopy main panel 82A and integrally and fluidly connected to a forward end 102A of the first main longitudinal water channel 102 and a forward end 106A of the second main longitudinal water channel 106. In various embodiments, the canopy main panel 82A additionally includes at least one water egress orifice 114 formed in and extending through a bottom of an intermediate portion of the forward lateral water channel 110. As used herein, an intermediate portion of the forward lateral water channel 110 will be understood to mean that the water egress orifice(s) 114 are formed in and extend through the bottom of any portion of the forward lateral water channel 110 that is inward toward a centerline C of the canopy main panel 82A from the corners of the canopy main panel 82A where the first and second main longitudinal water channels 102 and 106 join or merge into the forward lateral water channel 110. That is, when the canopy main panel 82A is mounted to the front canopy downspout-strut 70 the water egress orifice(s) 114 are aligned with the water ingress openings 86 and not aligned with any portion of the internal lumen 90 within either the first or second downspout legs 70B and 70C of front canopy downspout-strut 70.

In various embodiments, the canopy main panel 82A further comprises a spout or funnel 118 integrally formed with and disposed around a perimeter of each respective egress orifice 114 and extending from an underside of the canopy main panel 82A. Each spout 118 is structured and operable to extend into a respective one of the water ingress opening(s) 86 in the header 70A of the forward canopy downspout-strut 70 when the canopy main panel 82A is mounted to the forward canopy downspout-strut 70. Accordingly, water flowing through the forward lateral water channel 110 will flow into and through the water egress orifice(s) 114 of the canopy main panel 82A, then into and through the water ingress opening(s) 86 and into the portion of the internal lumen 90 within the forward canopy downspout-strut header 70A. The water will then flow through the portion of the internal lumen 90 within the forward canopy downspout-strut header 70A and into the portions of the internal lumen 90 within first and second downspout legs 70B and 70C, whereafter the water will flow through the portions of the internal lumen 90 within the first and second downspout legs 70B and 70C and be discharged from the distal ends 94 and 98 of the first and second downspout legs 70B and 70C. As described above, the distal ends 94 and 98 of the first and second downspout legs 70B and 70C are mounted to the vehicle 10 such that the distal ends 94 and 98, and the internal lumen 90 therewithin are directed away from the passenger compartment 26. Therefore, the water or liquid flowing through the main canopy panel first and second main longitudinal channels and forward lateral channel 102, 106 and 110 and into internal lumen 90, via the water egress orifice(s) 114 and water ingress opening(s) 86, will flow through the internal lumen 90 and be discharged from the distal ends 94 and 98 of the first and second downspout legs 70B and 70C and directed away from any passenger(s) sitting in the main seating structure 38.

As described above, although the present disclosure is described with regard to a generic lightweight vehicle, it should be understood that the canopy system 62 disclosed herein can have application to all types of lightweight vehicles that are not designated for use on roadways, e.g., golf cars, maintenance vehicles, cargo vehicles, shuttle vehicles, worksite vehicles, etc.

Referring now to FIGS. 1, 2, 3 and 6, in various embodiments, the main panel includes a rearward lateral water channel 122 recessed within and extending laterally along a rearward end portion of the canopy main panel 82A. The rearward lateral water channel 122 is integrally and fluidly connected to a rearward end portion 102B of the first main longitudinal water channel 102 and a rearward end portion 106B of the second main longitudinal water channel 106. The rearward lateral water channel 122 is structured and operable to direct water into the end portions 102B and 106B of the first and second main longitudinal water channels 102 and 106. In various embodiments, the rearward end portions 102B and 106B of the first and second main longitudinal water channels 102 and 106 are open along a rearward end or edge 126 of the canopy main panel 82A (i.e., not closed or blocked, do not include a rearward wall) such that water can exit the first and second main longitudinal water channels 102 and 106 via the open end portions 102B and 106B if the vehicle 10 is oriented such that the forward lateral edge portion 112 of the canopy main panel 82A is positioned at a higher elevation than the rear edge 126 of the canopy main panel 82A (e.g., when the vehicle is moving up or positioned on a hill or incline). Accordingly, in such uphill orientations, water, rain or other liquid that enters the rearward lateral water channel 122 will flow through the rearward lateral water channel 122 and into the open end portions 102B and 106B of the first and second main longitudinal water channels 102 and 106, whereafter the water/rain/liquid will be discharged from the canopy main panel 82A away from the passenger compartment 26 (and passengers therewithin), via the first and second main longitudinal water channel open end portions 102B and 106B.

In various embodiments, the canopy main panel 82A further comprises a recessed extension connection section 130 that extends rearward from the rearward lateral water channel 122 to the rearward edge or end of the canopy main panel 82A. The recessed extension connection section 130 has a top surface 130A extending rearward from the rearward lateral water channel 122 that is recessed relative to a top surface 82AA of the canopy main panel 82A extending forward from the rearward lateral water channel 122 (e.g., lower than the top surface 82AA of the canopy main panel 82A extending forward from the rearward lateral water channel 122). As described below, the recessed extension connection section 130 is structured and operable to allow a canopy extension panel 82B (FIG. 7) to be connected to the canopy main panel 82A such that a top surface 82BA of the canopy extension panel 82B is substantially coplanar with the top surface 82AA of the canopy main panel 82A along the length of the of the rearward lateral water channel 122.

Referring now to FIGS. 4, 5, 6, 7, 8, 9 and 10, as described above, in various embodiments the water channel and downspout canopy system 62 can additionally include a canopy extension panel 82B that is connectable to the canopy main panel 82A via the recessed connection section 130. The canopy extension panel 82B is connectable to the canopy main panel 82A such that the rearward lateral water channel 122 is disposed between the canopy extension panel 82B and the canopy main panel 82A. The canopy extension panel 82B extends over and protects the rear portion of the vehicle 10 from rain, water and sun. Moreover, as described below, the canopy extension panel 82 channels or directs water or rain or other liquid away from the rear portion of the vehicle 10, for example away from passengers seated in the auxiliary seating structure 60, or golf clubs and bags stored in bag well 66, or items stored on a rear cargo deck.

As described above, the canopy extension panel 82B connects to canopy main panel 82A via the recessed extension connection section 130 such that the top surface 82BA of the canopy extension panel 82B is substantially coplanar with the top surface 82AA of the canopy main panel 82A along the length of the of the rearward lateral water channel 122. That is, the canopy extension panel top surface 82BA has substantially the same contour and lateral cross-sectional profile as the canopy main panel top surface 82AA. Therefore, any longitudinal line extending across the canopy main panel top surface 82AA parallel with the center line C will be substantially colinear with a respective longitudinal line extending across the canopy extension panel top surface 82BA. Moreover, when the canopy extension panel 82B is mounted to the canopy main channel 82A, a front wall of the rearward lateral water channel 122, defined by canopy main panel 82A, and a rear wall of the rearward lateral water channel 122, defined in part by canopy main panel 82A and in part by the canopy extension panel 82B, will have substantially the same height at any point along the length of the rearward lateral water channel 122. That is, the rearward lateral water channel 122 will have substantially the same depth relative to the top surfaces 82AA and 82BA of the canopy main and extension panels 82A and 82B at any given point along the length of the rearward lateral water channel.

Figure 8:
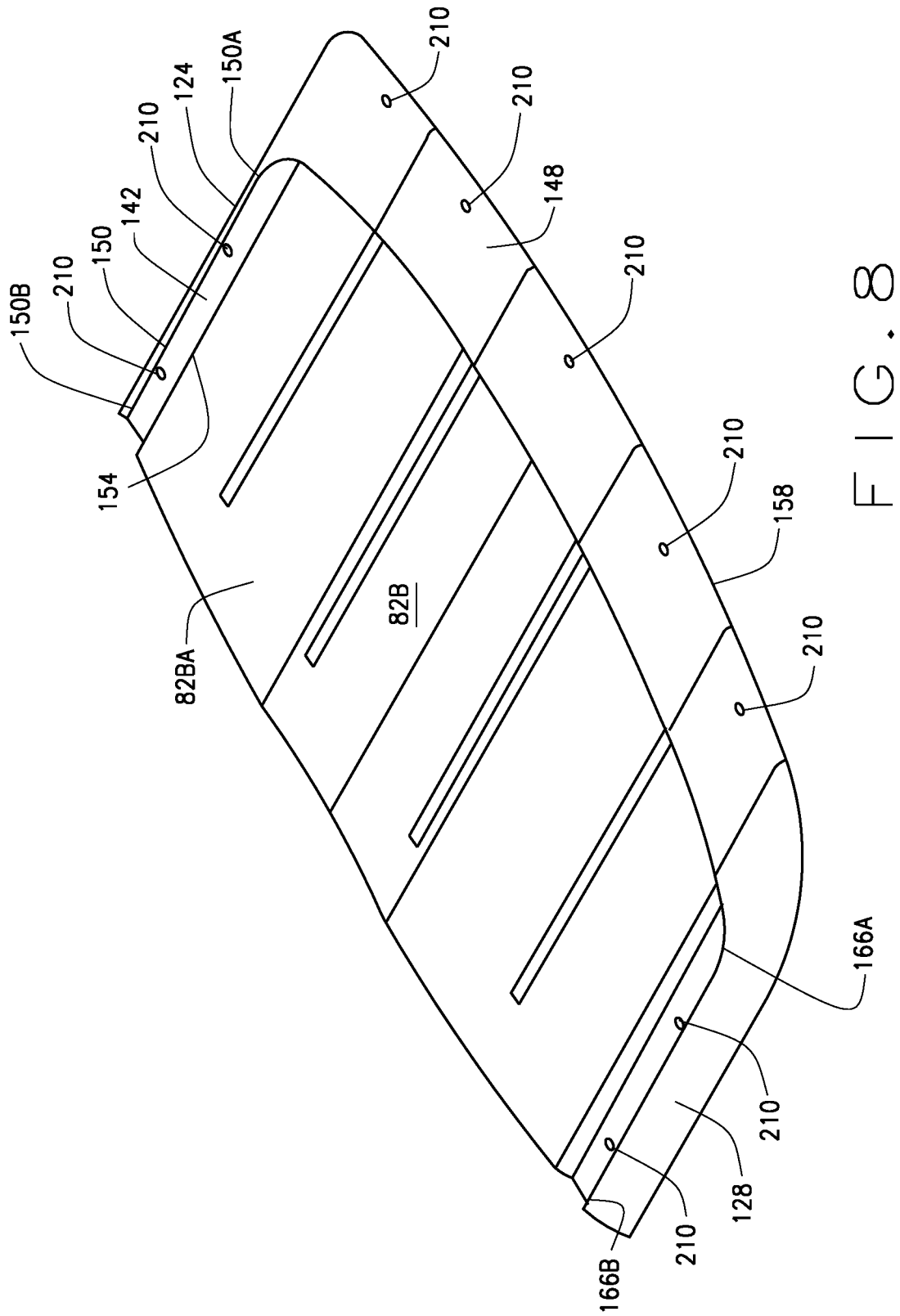
FIG. 8 is an isometric view of the extension panel of the water channel and downspout canopy system shown in FIG. 7, in accordance with various embodiments of the present disclosure.
Figure 9:
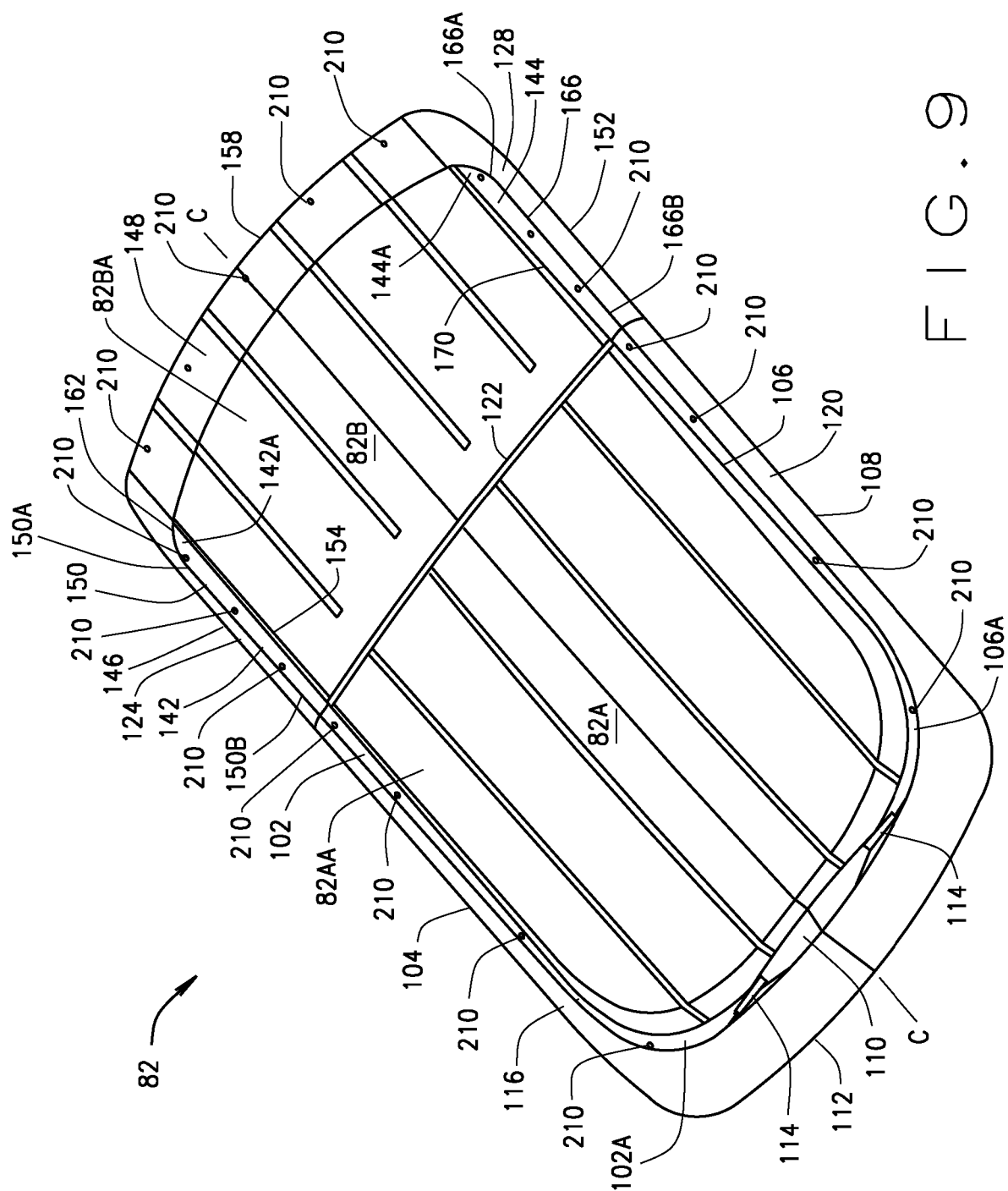
FIG. 9 is a top of a canopy of the canopy water channel and downspout shown in FIGS. 1-7 including the main panel and the extension panel connected thereto, in accordance with various embodiments of the present disclosure.

Referring particularly to FIGS. 8 and 9, the canopy extension panel 82B comprises a first extension longitudinal water channel 142 that extends along a first longitudinal edge portion 146 of the canopy extension panel 82B and a second extension longitudinal water channel 144 that extends along a second longitudinal edge portion 152 of the canopy extension panel 82B. When the canopy extension panel 82B is connected to the canopy main panel 82A, the first extension longitudinal water channel 142 aligns with and is fluidly connected to the first main longitudinal water channel 102. Similarly, when the canopy extension panel 82B is connected to the canopy main panel 82A, the second extension longitudinal water channel 144 aligns with and is fluidly connected to the second main longitudinal water channel 106. The first and second extension longitudinal water channels 142 and 144 each comprise a termination end 142A and 144A, respectively, that are abutted by a raised tail portion 148 formed along a rearward lateral edge portion of the canopy extension panel 82B. The first and second extension longitudinal water channels 142 and 144 are structured and operable to direct water, rain or other liquid that may fall on the canopy extension panel 82B into the first and second main longitudinal water channels 102 and 106 of the canopy main panel 82A, which will in turn direct the water, rain or other liquid into the internal lumen 90 of the front canopy downspout-struct 70 as described above.

The first extension longitudinal water channel 142 includes an exterior sidewall 150 and an interior sidewall 154 that extend along the length of and define the first extension longitudinal water channel 142. In various instances, the first extension longitudinal water channel exterior sidewall 150 is structured or formed such that a distal end portion 150A has a shorter or lower height from the bottom of the first extension longitudinal water channel 142 than a proximal end 150B portion. Therefore, in instances where the vehicle 10 is oriented such that the forward lateral edge portion 112 of the canopy 82 is positioned at a higher elevation than a rear edge 158 of the canopy 82 and/or of the canopy extension panel 82B (e.g., when the vehicle is moving up or positioned on a hill or incline), the first extension longitudinal water channel 142 is structured and operable to direct water to exit the channel 142 at the distal end 150A of the exterior sidewall 150. Hence, water, rain or other liquid can exit the first extension longitudinal water channel 142 via the exterior wall sidewall distal end portion 150A. Accordingly, in such uphill orientations, water, rain or other liquid that enters the first main longitudinal water channel 102 and/or the first extension longitudinal water channel 142 will flow through the first extension longitudinal water channel 142 to the termination end 142A, whereafter the water/rain/liquid will be discharged from the canopy extension panel 82B away from the passenger compartment 26 (and passengers therewithin), via the lower exterior sidewall distal end portion 150A. Additionally, the first extension longitudinal water channel 142 comprises an end wall 162 provided by and/or defined by the raise tail portion 148 of the canopy extension panel 82B. The end wall 162 has a taller or higher height from the bottom of the first extension longitudinal water channel 142 than the channel exterior sidewall distal end 150A, thereby forcing water within the first extension longitudinal channel 142 to exit and be discharged from the first extension longitudinal channel 142 via the lower exterior sidewall distal end portion 150A.

The second extension longitudinal water channel 144 includes an exterior sidewall 166 and an interior sidewall 178 that extend along the length of and define the second extension longitudinal water channel 144. In various instances, the second extension longitudinal water channel exterior sidewall 166 is structured or formed such that a distal end portion 166A has a shorter or lower height from the bottom of the second extension longitudinal water channel 144 than a proximal end 166B portion. Therefore, in instances where the vehicle 10 is oriented such that the forward lateral edge portion 112 of the canopy 82 is positioned at a higher elevation than the rear edge 158 of the canopy 82 and/or of the canopy extension panel 82B (e.g., when the vehicle is moving up or positioned on a hill or incline), the second extension longitudinal water channel 144 is structured and operable to direct water to exit the channel 144 at the distal end 166A of the exterior sidewall 166. Hence, water, rain or other liquid can exit the first extension longitudinal water channel 142 via the exterior wall sidewall distal end portion 150A. Accordingly, in such uphill orientations, water, rain or other liquid that enters the second main longitudinal water channel 106 and/or the second extension longitudinal water channel 144 will flow through the second extension longitudinal channel 144 to the termination end 144A, whereafter the water/rain/liquid will be discharged from the canopy extension panel 82B away from the passenger compartment 26 (and passengers therewithin), via the lower exterior sidewall distal end portion 166A. Additionally, the second extension longitudinal water channel 144 comprises an end wall 182 provided by and/or defined by the raise tail portion 148 of the canopy extension panel 82B. The end wall 182 has a taller or higher height from the bottom of the second extension longitudinal water channel 144 than the channel exterior sidewall distal end 166A, thereby forcing water within the second extension longitudinal channel 144 to exit and be discharged from the second extension longitudinal channel 144 via the lower exterior sidewall distal end portion 166A.

Figure 6:
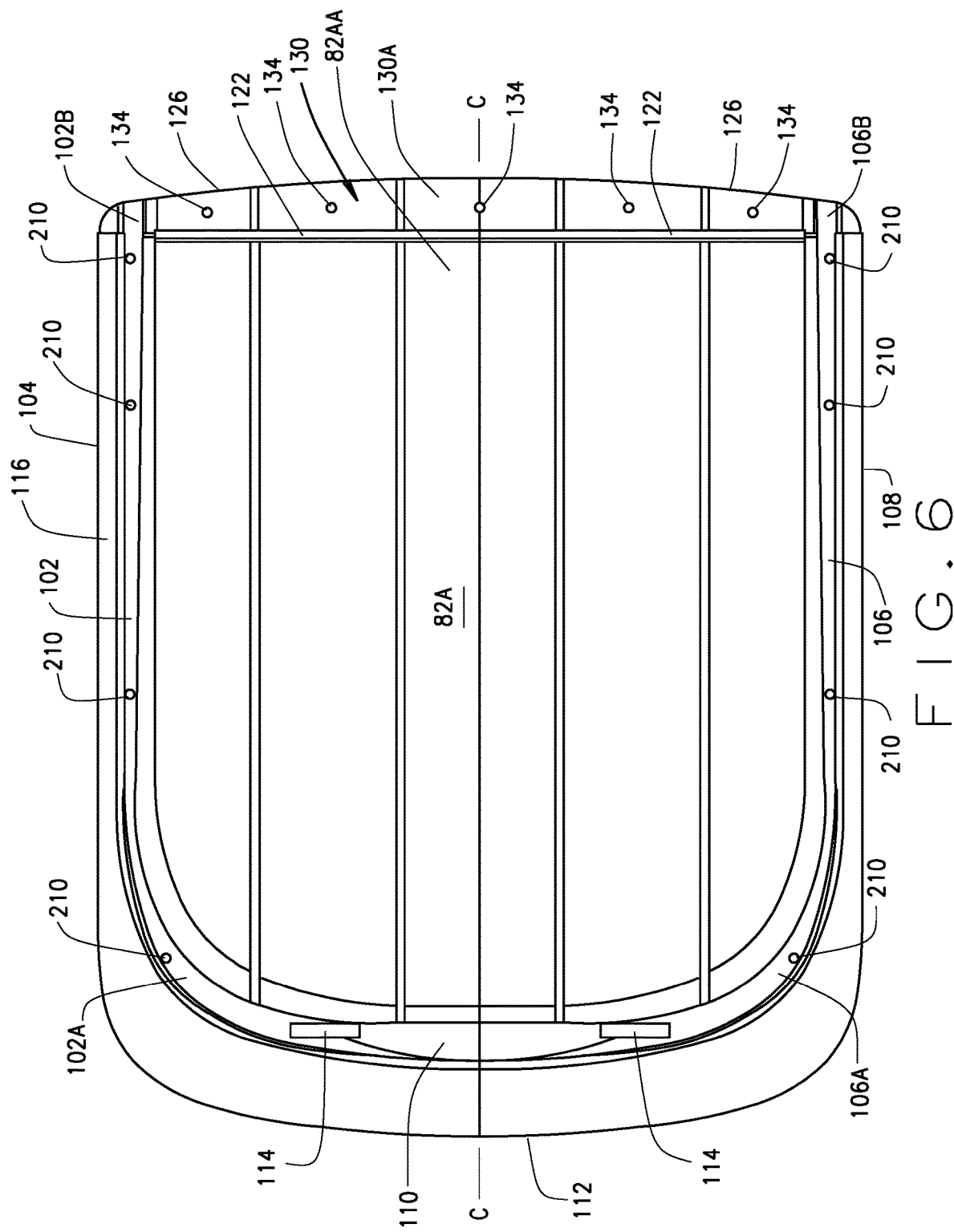
FIG. 6 is a top view of a main panel of the water channel and downspout canopy system shown if FIGS. 1, 2, 3 and 4, in accordance with various embodiments of the present disclosure.
Figure 10:
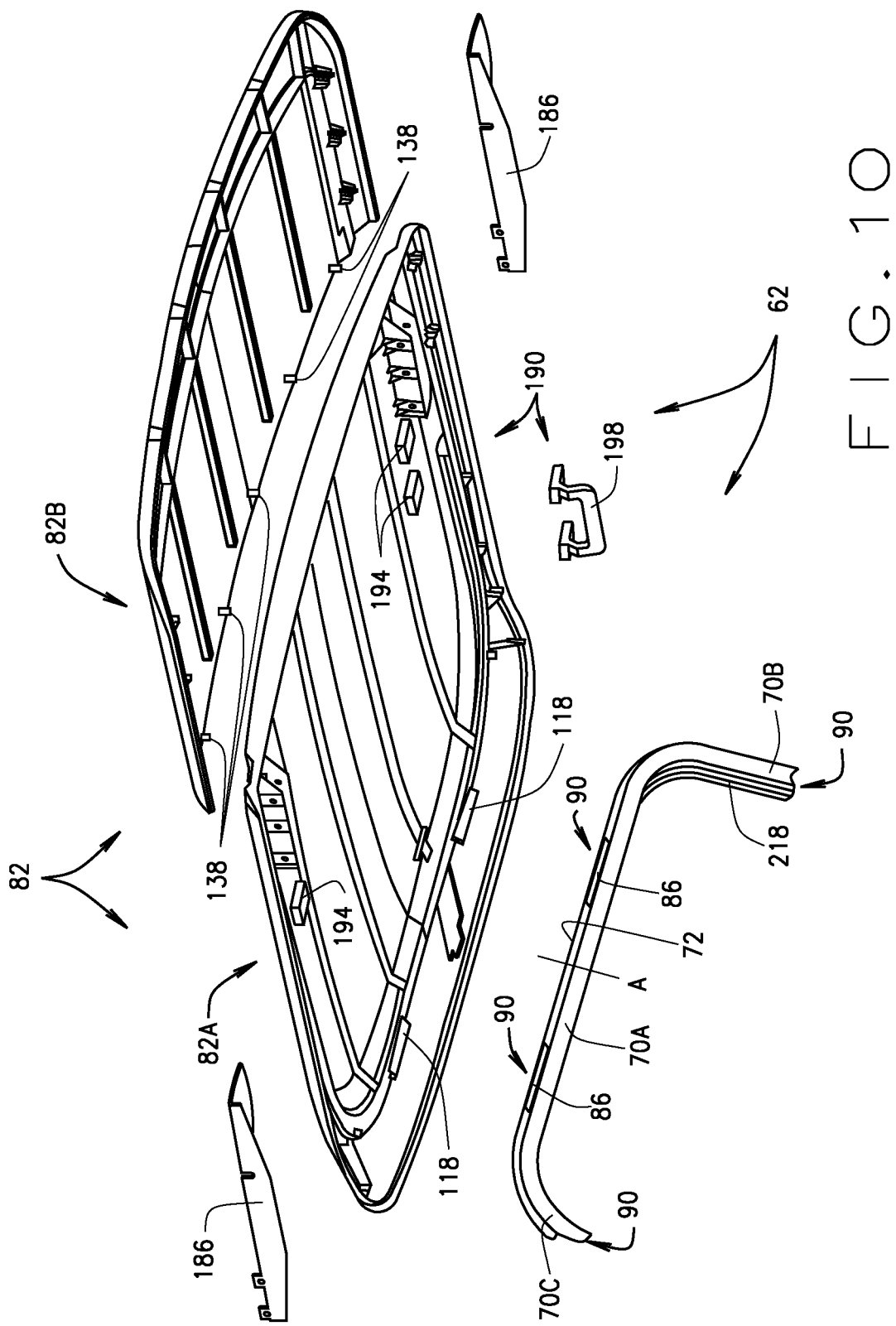
FIG. 10 is an exploded view of the canopy of the canopy water channel and downspout shown in FIGS. 1-9 including the main panel and the extension panel connected thereto, in accordance with various embodiments of the present disclosure.

As exemplarily illustrated in FIGS. 6 and 10, in various embodiments, the canopy main panel 82A includes a plurality of apertures, holes or boss receptacles 134 that extend into and/or through the recessed extension connection section 130. Additionally, the canopy extension panel 82B includes a plurality of alignment and connection bosses 138 that extend from an underside and along a leading edge portion of the canopy extension panel 82B. The boss receptacles 134 and bosses 138 are located in the respective canopy main and extension panels 82A and 82B such that when the when the bosses 138 are inserted into the boss receptacles 134 to connect the canopy extension panel 82B to the canopy main panel 82A, the first and second main longitudinal water channels 102 and 106 respectively align with the first and second extension longitudinal water channels 142 and 144, and the top surface 82BA of the canopy extension panel 82B is substantially coplanar with the top surface 82AA of the canopy main panel 82A, as described above. Bolts, screws or other fixation devices can be inserted into and through bosses 138 and/or the boss receptacles 134 to fixedly connect the extension panel 82B to the main panel 82A. Additionally, in various embodiments, the canopy system 62 can include brackets or braces 186 that are connectable to the underside of the canopy main panel 82A and the underside of the canopy extension panel 82B, using any suitable connection device, apparatus, means or method (e.g., bolts, screws or other fixation device) to support the canopy extension panel 82B such that the canopy extension panel 82B is cantilevered from the canopy main panel 82A.

Figure 4:
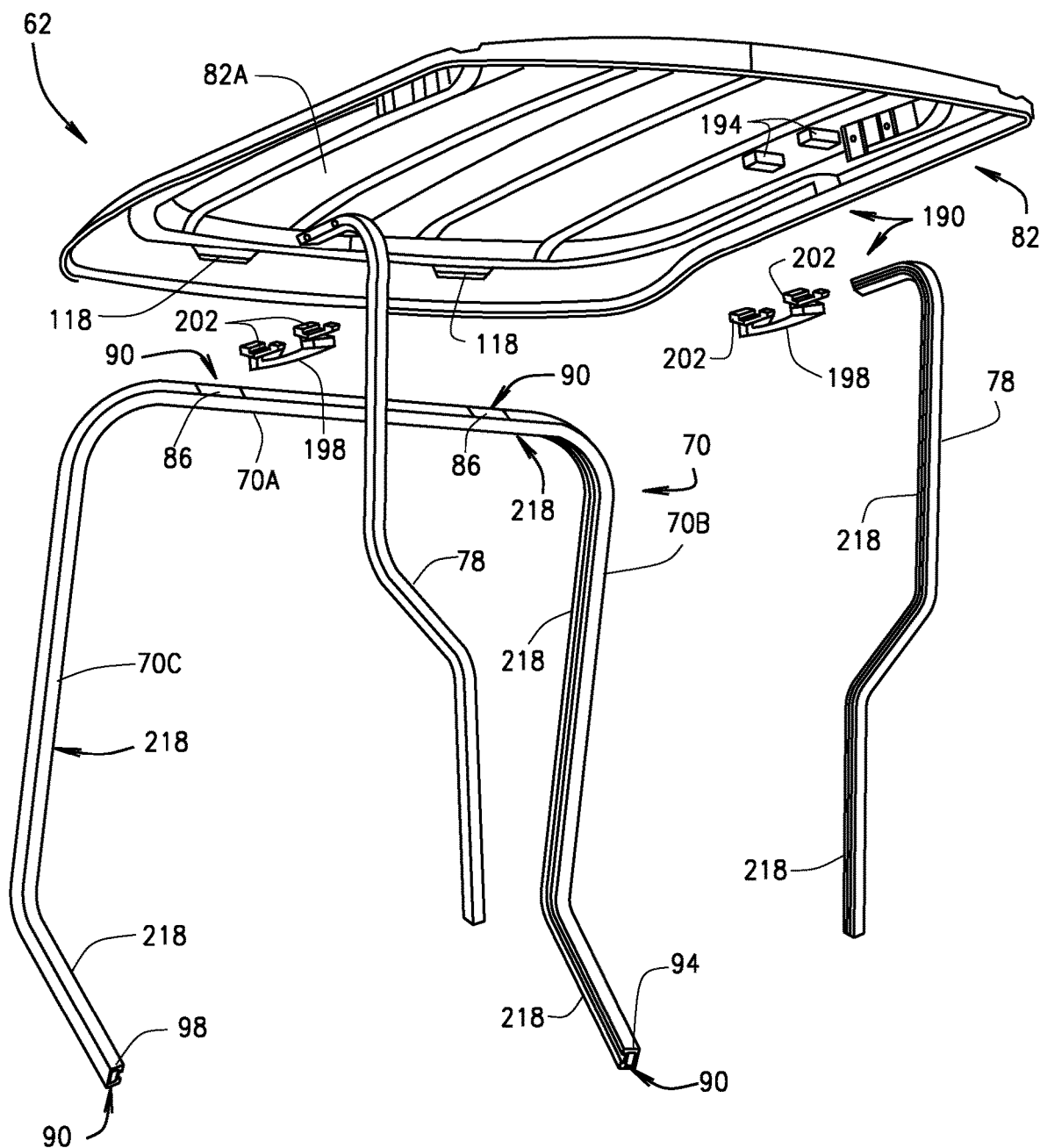
FIG. 4 is an exploded view of the water channel and downspout canopy system shown if FIGS. 1, 2 and 3, in accordance with various embodiments of the present disclosure.
Figure 5:
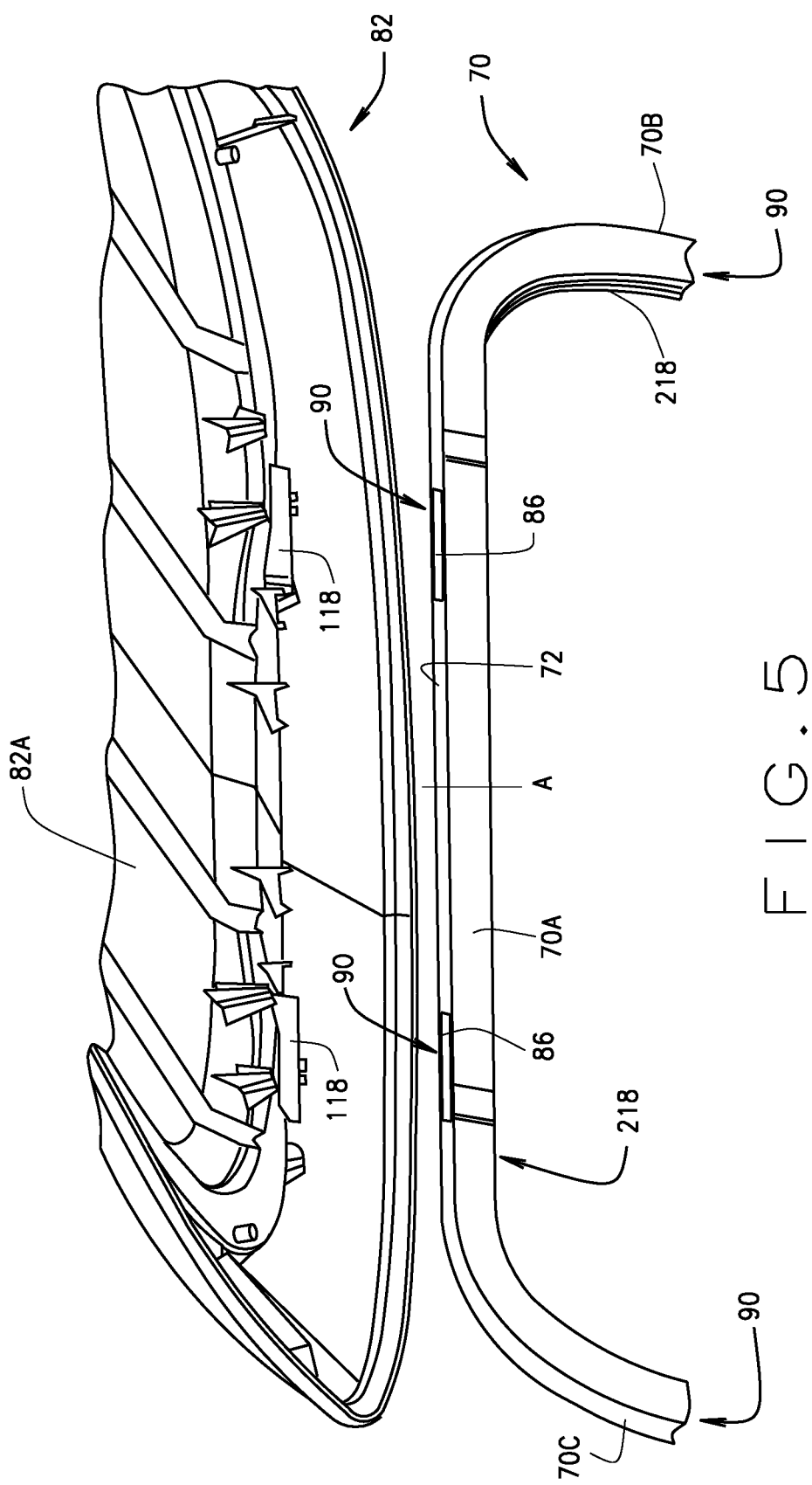
FIG. 5 is an exploded view of a portion of the water channel and downspout canopy system shown if FIGS. 1, 2, 3 and 4, in accordance with various embodiments of the present disclosure.
Figure 7:
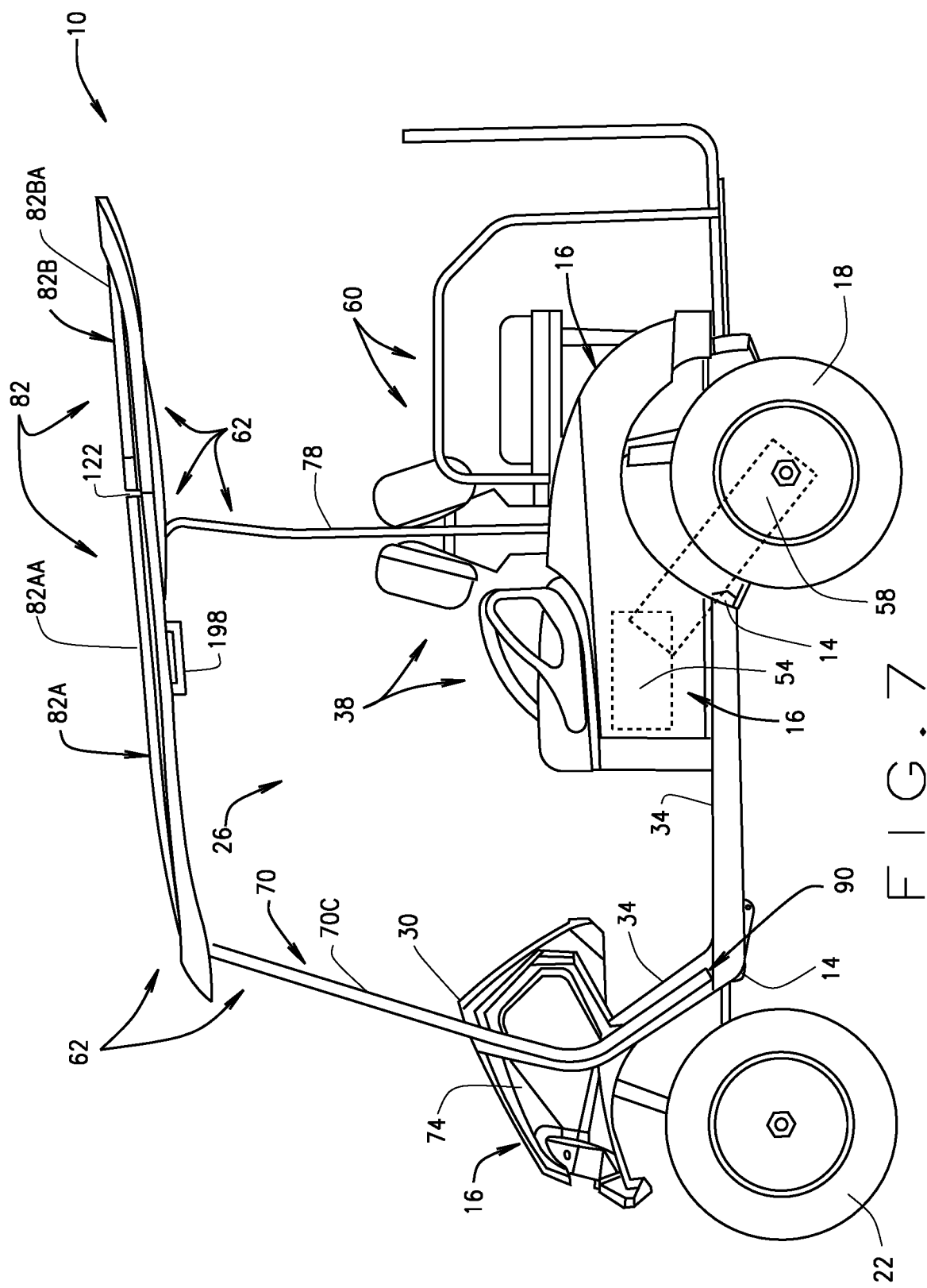
FIG. 7 is a side view of a low speed utility vehicle, exemplarily illustrated as passenger transport, comprising the water channel and downspout canopy system shown in FIGS. 1 through 6 including an extension panel, in accordance with various embodiments of the present disclosure.

As exemplarily illustrated in FIGS. 4, 7 and 10, in various embodiments, the canopy system 62 can further include one or more retractable handle assembly 190 for use by passengers to assist in entering and/or exiting the vehicle passenger compartment 26. The retractable handle assembly 190 generally comprises at least one handle retention structure 194 integrally formed with or connected to the underside of the canopy main panel 82A, and a handle 198 pivotally, and in various instances retractably, disposed and retained within the at least one handle retention structure 194. The handle 198 is pivotal between an Open position and a Closed position (both shown in FIG. 4). In the Open position, the handle 198 extends downward toward the floorboard 34 such that it is accessible to be grasped by a vehicle passenger to assist in entering and/or exiting the vehicle passenger compartment 26. When in the Closed position, the handle 198 is folded up to be substantially parallel with the underside of the canopy main panel 82A such that it does not interfere with or impede with a passenger entering or exiting the passenger cabin 26 without use of the handle 198, or leaning into the passenger cabin 26 while standing on the ground outside the passenger cabin 26. Moreover, in various embodiments, the retractable handle assembly 190 can include a biasing device 202 (e.g., a spring or other suitable biasing device) that is structured and operable to bias the handle to the Closed position such that when the handle 198 is not being used (e.g., no grasped by a passenger) the handle 198 will automatically retract to the Closed position.

Referring now to FIGS. 6, 8, 9, 11, 12 and 12A, in various embodiments the water channel and downspout canopy system 62 can further include a vehicle enclosure assembly 206. The enclosure assembly 206 generally comprises a first enclosure mounting rail 206A, a second enclosure mounting rail 206B, a rear enclosure mounting rail 206C and an enclosure curtain 206D. The enclosure assembly 206 is structured and operable to enclose and protect the passenger compartment 26, the auxiliary seating structure 60, the back deck, and/or the golf bag well 66 from environmental elements such as rain, wind, snow, dirt, dust, cold, etc. In such embodiments, the canopy 82 comprises a plurality of enclosure rail fasteners 210 connected to or integrally formed with the canopy 82 and disposed within the first and second canopy main and extension longitudinal water channels 102, 106, 142 and 144 and along a rearward edge of the canopy tail portion 148. The enclosure rail fasteners 210 can comprise any fastener suitable for fixedly mounting the first, second and rear enclosure mounting rails 206A, 206B and 206C to the canopy first and second canopy main and extension longitudinal water channels 102, 106, 142 and 144 and the canopy tail portion 148 (e.g., snaps, grommets, screw or bolt bosses, screws, bolt or rivet orifices, etc.). The first and second enclosure mounting rails 206A and 206B have a lateral cross-sectional profile, shape or form that is substantially the same as the lateral cross-sectional shape or profile of the first and second canopy main and, in various instances, extension longitudinal water channels 102, 106, 142 and 144 and the first and second sidewalls of the main canopy and, in various instances, the extension panel sidewalls 116, 120 124 and 128, such that the first and second enclosure mounting rails 206A and 206B will form a liner disposed within the first and second canopy main and, in various instances, the extension longitudinal water channels 102, 106, 142 and 144 and over the main canopy and, in various instances, the extension panel sidewalls 116, 120 124 and 128, whereby the first and second enclosure mounting rails 206A and 206B will provide the water channels in which the water, rain or other liquid will flow.

More specifically, the first and second enclosure mounting rails 206A and 206B have a lateral cross-sectional profile, shape or form that has a bottom and channel walls and a sidewall that have substantially the same cross-sectional profile, form or shape as the bottom, channels walls and sidewall of the first and second canopy main and, in various instances, extension longitudinal water channels 102, 106, 142 and 144 and the first and second sidewalls of the main canopy and, in various instances, the extension panel sidewalls 116, 120 124 and 128, such that the first and second enclosure mounting rails 206A and 206B will form a liner disposed within the first and second canopy main and extension longitudinal water channels 102, 106, 142 and 144 and over the sidewalls 116, 120, 124 and 128, whereby the first and second enclosure mounting rails 206A and 206B will provide the water channels in which the water, rain or other liquid will flow. It should be understood that although FIG. 12A exemplarily illustrates the lateral cross-section of the second main and, in various instances, the extension longitudinal water channels 106 and 144, FIG. 12A is equally applicable and illustrating of the lateral cross-section of the first main and, in various instances, the extension longitudinal water channels 102 and 142, as one skilled in the art would readily understand such is simply a mirror image of what is shown in FIG. 12A.

In various embodiments, the enclosure curtain 206D can be fixedly connected to the first, second and rear enclosure mounting rails 206A, 206B and 206C. In such embodiments, the enclosure assembly 206 can be mounted to the canopy 82 by: 1) connecting the first enclosure mounting rail 206A to the canopy 82 within the first canopy main and extension longitudinal water channels 102 and 142 such that the first enclosure mounting rail 206A is supported by the main panel first sidewall 116 and a first sidewall 124 of the extension panel 82B; 2) connecting the second enclosure mounting rail 206B to the canopy 82 within the second canopy main and extension longitudinal water channels 106 and 144 such that the second enclosure mounting rail 206B is supported by the main panel second sidewall 120 and a second sidewall 128 of the extension panel 82B; and 3) connecting the rear enclosure mounting rail 206C to the tail portion 148 of canopy 82. Once the first, second and rear enclosure mounting rails 206A, 206B and 206C are connected to the canopy 82, the enclosure curtain 206D will extend downward from the canopy 82 and be draped around the sides and rear perimeter of the vehicle 10. In various instances of such embodiments, the enclosure assembly can further include front strut rails 214 to which front edges of the curtain 206D are fixedly or removably connected. The front strut rails 214 are connectable (via any suitable fastening means, method or device, e.g., snaps, screws or bolts, rivets, etc.) to the first and second downspout legs 70B and 70C of the front canopy downspout-strut 70, thereby securing the front edges of the curtain 206D to the front canopy downspout-strut 70.

Alternatively, in various other embodiments, the enclosure curtain 206D can be removably connectable to the first, second and rear enclosure mounting rails 206A, 206B and 206C. In such embodiments, the enclosure assembly 206 can be mounted to the canopy 82 by: 1) connecting the first enclosure mounting rail 206A to the canopy 82 within the first canopy main and extension longitudinal water channels 102 and 142 such that the first enclosure mounting rail 206A is supported by the main panel first sidewall 116 and the first sidewall 124 of the extension panel 82B; 2) connecting the second enclosure mounting rail 206B to the canopy 82 within the second canopy main and extension longitudinal water channels 106 and 144 such that the second enclosure mounting rail 206B is supported by the main panel second sidewall 120 and a second sidewall 128 of the extension panel 82B; 3) connecting the rear enclosure mounting rail 206C to the tail portion 148 of canopy 82; and 4) connecting the enclosure curtain 206D to the first, second and rear enclosure mounting rails 206A, 206B and 206C, whereby the enclosure curtain 206D will extend downward from the canopy 82 and be draped around the sides and rear perimeter of the vehicle 10. The enclosure curtain can be removably connectable to the first, second and rear enclosure mounting rails 206A, 206B and 206C using any suitable connecting means, manner or device (e.g., snaps, clips, screws or bolts, rivets, interlocking fasteners or strips, interlocking hook and loop connectors (e.g., Velcro®, etc.). In various instances of such embodiments, the enclosure assembly can further include front strut rails 214 to which front edges of the curtain 206D are fixedly or removably connected. The front strut rails 214 are connectable (via any suitable fastening means, method or device, e.g., snaps, screws or bolts, rivets, etc.) to the first and second downspout legs 70B and 70C of the front canopy downspout-strut 70, thereby securing the front edges of the curtain 206D to the front canopy downspout-strut 70.

It is envisioned that the enclosure curtain 206D can include one or more access panels, flaps, openings and/or doors that allow passengers to access, enter and/or exit the passenger compartment 26, the auxiliary seating structure 60, the back deck, and/or the golf bag well 66. In various embodiments, the enclosure curtain 206D can have a single-piece configuration such that enclosure curtain 206D is a single unified unit that is connected to, or is removably connectable to, the first, second and rear enclosure mounting rails 206A, 206B and 206C and wraps around the vehicle from first downspout leg 70B of the front canopy downspout-strut 70 to the second downspout leg 70C. Alternatively, in various embodiments, the enclosure curtain 206D can have a multi-piece unit configuration such that enclosure curtain 206D comprises a plurality separate independent sections or pieces that are each separately connected to or removable connectable to one or more of the first, second and rear enclosure mounting rails 206A, 206B and 206C. In such multi-piece embodiments, the separate independent sections or pieces can be connectable to each other via any suitable connection means, manner or device (e.g., zippers, snaps, clips, interlocking hook and loop connectors, etc.) to provide an assembled multi-piece curtain 206D that wraps around the vehicle from first downspout leg 70B of the front canopy downspout-strut 70 to the second downspout leg 70C.

Referring now to FIGS. 1, 2, 3, 4, 5, 7, 10, 11, 12, 13, 14, 15, 16, 17 18 and 19, in various embodiments, the front canopy downspout-strut 70 and/or the rear canopy strut(s) 78 can comprise a dovetailed shaped accessory attachment channel 218 (sometime referred to herein as the dovetailed channel 218) that is structured and operable to provide a means or manner for attaching accessories (e.g., mirrors, speakers, windshields and other types of accessories) to the respective front canopy downspout-strut 70 and/or the rear canopy strut(s) 78 utilizing a chamfered side pinch nut 222, as described below. More particularly, at least one of the front canopy downspout-strut header 70A, the first downspout leg 70B, the second downspout leg 70C and/or the rear canopy strut(s) 78 comprises the dovetailed channel 218. Generally, as described further below, any desired vehicle accessory can be mounted or attached to the front canopy downspout-strut 70 and/or the rear canopy strut(s) 78 by inserting the pinch nut 222 into the dovetailed channel 218, then turning or rotating the pinch nut 222 within the dovetailed channel 218 such that the pinch nut 222 will bindingly engage with the dovetailed channel 218 (e.g., become pinched, bound, or lodged within the dovetailed channel 218). Thereafter, an accessory can be threadingly connected to the pinch nut (and hence the respective front canopy downspout-strut 70 and/or the rear canopy strut(s) 78) via threaded stud of the accessory, or a bolt, or a threaded rod and secondary nut.

In various embodiments, the dovetailed channel 218 comprises a mouth 226 and a base 230 having a width W that is greater than a width M of the mouth 226, thereby defining a pair of opposing angled or beveled walls 232 that extend between the mouth 226 and the base 230. Particularly, the walls 232 form an angle β with the base 230 that is less than 90°. The pinch nut 222 generally includes opposing first and second flat sides 234, opposing angled or beveled sides 238 having rounded corners, and a threaded bore 242. The first and second flat sides 238 are substantially straight along their entire length and form substantially a 90° angle with a base 246 of the pinch nut 222. In various instances, the base 246 has a length Y, extending between angled sides 238, that is substantially equal to the width W of the base 230 of the dovetailed channel 218. Additionally, the base 246 has a width Z that is substantially equal to or slightly less than the width M of the mouth 226 of the dovetailed channel 218. The angled sides 238 include a substantially flat straight portion 238A and a rounded corner portion 238B. The flat portions 238A form an angle θ with the bottom 246 of the pinch nut 222. In various embodiments, the angle θ of the pinch nut flat portions 238A can be substantially equal to the angle β of the dovetailed channel walls 234 such that when the pinch nut 222 is disposed within the dovetailed channel, and the flat portions 238A of the pinch nut 222 are aligned with (e.g., substantially parallel with) the dovetailed channel walls 234, the pinch nut 222 can be easily slid and moved along the length of and within the dovetailed channel 218.

The rounded corner portions 238B of the pinch nut angled sides 238 have a curved length C that extends from a junction 238C between the flat portion 238A and the rounded portion 238B to a junction 238D between the rounded portion 238B and the respective flat side 234. As illustrated in FIG. 17, the angle of the rounded portions 238B relative to the base 246 at the junction 238C is θ (i.e., the same as the angle of the flat portion 238A). Notably, the angle of the rounded portions 238B progressively decreases (i.e., progressive gets smaller or more acute) across the curved length C from the junction 238C to the junction 238D such that the angle of the rounded portions 238B relative to the base 246 at the junction 238D is α. As described above, the angle α of the rounded portions 238B at the junction 238D is smaller than the angle θ of the rounded portions 238B at the junction 238C. Therefore, the length D of the junction 238C is shorter than the length E of the junction 238D. Moreover, the angle α of the rounded portions 238B at the junction 238D is smaller than the angle β formed between the dovetailed channel walls 232 and base 230, and the length D of the junction 238C is shorter than the length F of the dovetailed channel walls 232.

Due to the rounded corner portions 238B and the angle α of the rounded portions 238B at the junction 238D being smaller (or more acute) than the angle β formed between the dovetailed channel walls 232 and base 230, when the pinch nut 222 is inserted into the dovetailed channel 218, as exemplarily illustrated in FIG. 15, the pinch nut 222 can be rotated in the direction shown in FIG. 15. Moreover, as the pinch nut 222 is rotated, the rounded portions 238B of the angled sides 238 of the pinch nut 222 will slide under the beveled sidewalls 232 of the dovetailed channel 218. As the pinch nut 222 is further rotated, the pinch nut 222 rounded corner portion 238B will be advanced between the dovetailed channel beveled sidewalls 232 and base 230 such that the angle of a contact area of the rounded corner portion 238B that is in contact with the dovetailed channel beveled sidewalls 232 will continuously increase until contact area angle of the rounded corner portion 238B is substantially equal to the angle β of the dovetailed channel walls 234, thereby causing the pinch nut 222 to become pinched, lodged or bound between dovetailed channel sidewalls 232 and base 230. Therefore, but turning or rotating the pinch nut 222 within the dovetailed channel 218, the pinch nut 222 will become bindingly engaged and retained, or locked, within dovetailed channel 218.

The pinch nut 222 can be turn or rotated within the dovetailed channel 218 using any suitable means, manner or device. For example, in various embodiments the pinch nut 222 can further include an annular slotted boss 250 extending from a top face of the pinch nut 222. The annular slotted boss 250 generally includes a cylindrical body 250A having a turning implement slot 250B formed therein. The turning implement slot 250B is structured and operable to receive any turning implement, such as a screwdriver, a coin, a key, etc., suitable to for inserting into the turning implement slot 250B and causing the pinch nut 222 to turn or rotate within the dovetailed channel 218 by turning the turning the turning implement. It is envisioned that in various embodiments, the pinch nut 222 can be toollessly locked or retained in place (as described above) by utilizing the annular slotted boss 250 to hand-rotate the pinch nut 222 within the dovetailed channel 218 to lock or retain the pinch nut 222 in the desired location within the dovetailed channel 218. In such instances, once the pinch nut 222 is inserted into the dovetail channel 218 at the desired location of the front canopy down-spout strut 70 and/or the rear canopy strut(s) 78, the annular slotted boss 250 can be grasped by hand and rotated to bindingly engage the pinch nut 222 within the dovetailed channel 218 as described above.

The process of bindingly engaging the pinch nut 222 within the dovetailed channel 218, and thereby retaining, or locking, the pinch nut 222 at a desired location within the dovetailed channel 218 has been described above. It should be readily understood the process of removing the pinch nut 222 from the dovetailed channel 218, or moving the pinch nut 222 within the dovetailed channel simply the reverse of process to bindingly engage the pinch nut 222 within the dovetailed channel 218. That is, to remove or move the pinch nut 222 from or within the dovetailed channel 218, the pinch nut 222 can be rotated in a direction opposite that shown in FIG. 15 to disengage the corner portions 238B of the angled sides 238 from the beveled walls 232 of the dovetailed channel 218, whereafter the pinch nut 222 can be removed from the dovetailed channel 218 and/or moved to and engaged at a different location within the dovetailed channel 218.

As exemplarily illustrated in FIG. 18, once the pinch nut 222 is bindingly engaged and retained/locked at a desired location within the dovetailed channel 218 of any portion of the front canopy downspout-strut 70 and/or the rear canopy strut(s) 78, a vehicle accessory 254 (e.g., a mirrors, a speaker, a windshield and other type of accessories) can be connected to the front canopy downspout-strut 70 and/or the rear canopy strut(s) 78 utilizing the threaded bore 242. For example, a threaded rod can be threadingly engaged within the threaded bore 242, whereafter the accessory 254 can be disposed on the threaded rod (via a hole or slot in the accessory 254) and retained on the threaded rod by threading a nut (e.g., hex-sided nut, a wing-nut or a thumb nut) onto the threaded rod and tightening or advancing the nut such that the accessory 254 is bound between the nut and the top of the pinch nut annular slotted boss 252 and/or the respective front canopy downspout-strut 70 or the rear canopy strut(s) 78. Alternatively, the accessory 254 can include a threaded stud that can treaded into the pinch nut threaded bore 242. In yet other embodiments, it is envisioned that the accessory 254 can include a pinch nut 222 integrally formed or connected therewith, such that accessory can be mounted to the front canopy downspout-strut 70 and/or the rear canopy strut(s) 78 by inserting the integrally formed/connected pinch nut 222 into the respective dovetailed channel 218 and using the accessory 254 as a turning implement to turn the pinch nut 222 within the dovetailed channel 218, thereby bindingly engaging the pinch nut 222 within the dovetailed channel 218.

Referring particularly to FIGS. 13, 14 and 19, in various embodiments, the dovetail channel 218 can further include an off-center wire duct 258 recessed within the base 230 that is structured and operable to have wires (e.g., vehicle or accessory wires) disposed therein. The off-center wire duct 258 recessed within the base 230 such that a longitudinal center line WDCL of the wire duct 258 is offset and non-coaxial with a longitudinal center line BCL of the base 230. Therefore, the off-center wire duct 258 defines a first base section 230A and a second base section 230B, wherein the first base section 230 has a width P that is greater than a width Q of the second base section 230B. Moreover, since the first base section 230A has a width P that is greater than the width Q of the second base section 230B, the first base second 230A provides a bolt stop that is structured and operable to prevent a rod, bolt or stud threaded into a pinch nut 222 bindingly lodged within the dovetailed channel 218 from extending into the wire duct 258 and damaging any wires disposed therein.

More specifically, when a pinch nut 222 is bindingly lodged within the dovetailed channel 218 and a threaded rod, bolt or stud is threaded into the threaded bore 242 of the pinch nut 222 to attach an accessory to the respective front canopy downspout-strut 70 and/or the rear canopy strut(s) 78, the threaded rod, bolt or stud will contact the base first section 230A and be prevented from entering, or protruding into, the wire duct 258. Therefore, the base first section 230A provides a bolt stop (e.g., a rod, bolt or stud stop) that prevents the rod, bolt or stud from damaging wires disposed within the wire duct. Furthermore, once the rod, bolt or stud contacts the base first section 230A, if the rod, bolt or stud is turned further, the pinch nut will be drawn up the rod, bolt or stud such that the angle side 238 (e.g., the flat portion 238A and/or the rounded portion 238B) will be further forced against and engaged with beveled walls 232 of the dovetailed channel, thereby further securing the pinch nut 222 and associated accessory 254 at the desired location on the respective front canopy downspout-strut 70 and/or the rear canopy strut(s) 78.

It is envisioned that the accessory attachment system described herein, including the respective front canopy downspout-strut 70 and the rear canopy strut(s) 78 comprising the dovetail channel 232 (as described above) and the pinch nut 222 (as described above) will provide an attachment system that will reduce the time required to install accessories, reduce the number of fasteners required, reduce corrosion, and help protect wires.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A canopy for a lightweight vehicle, said canopy comprising:

a canopy main panel mountable to a hollow front canopy downspout-strut and at least one rearward canopy strut of the vehicle, wherein the main panel comprises:
a first main longitudinal water channel extending along a first longitudinal edge portion of the canopy main panel;
a second main longitudinal water channel extending along a second longitudinal edge portion of the canopy main panel;
a forward lateral water channel extending along a forward lateral edge portion of the canopy main panel and integrally and fluidly connected to a forward end of the first main longitudinal water channel and a forward end of the second main longitudinal water channel;
at least one water egress orifice formed in a bottom of an intermediate portion of the forward lateral water channel; and
at least one spout extending from a perimeter of the at least one egress orifice, the at least one spout integrally formed with and extending from an underside of the canopy main panel, wherein the at least one spout is structured and operable to extend into a water ingress opening in the front canopy downspout-strut of the vehicle when the canopy main panel is mounted to the front canopy downspout-strut.

2. The canopy of claim 1, wherein the main panel further comprises a passenger handle assembly, the passenger handle assembly comprising:
   at least one handle retention structure integrally formed with or connected to an underside of the canopy main panel; and
   a handle pivotally and retractably disposed and retained within the at least one handle retention structure.

3. The canopy of claim 1, wherein the main panel further comprises a rearward lateral water channel extending laterally along a rearward end portion of the canopy main panel and integrally and fluidly connected to a rearward end portion of the first main longitudinal water channel and a rearward end portion of the second main longitudinal water channel, the rearward lateral water channel structured and operable to direct water into the end portions of the first and second main longitudinal water channels, wherein the rearward end portions of the first and second main longitudinal water channels are open along a rearward edge of the canopy main panel such that water can exit the first and second main longitudinal water channels via the open end portions.

4. The canopy of claim 3, wherein the main panel further comprises a recessed extension connection section that extends from the rearward lateral water channel to a rearward end of the canopy main panel, the recessed extension connection section having a recessed top surface relative to a top surface of the canopy main panel extending forward of the rearward lateral water channel.

5. The canopy of claim 4 further comprising a canopy extension panel connectable to the recessed extension connection section of the canopy main panel such that the rearward lateral water channel is disposed between the canopy extension panel and the canopy main panel, and a top surface of the canopy extension panel is coplanar with the top surface of the canopy main panel.

6. The canopy of claim 5 wherein the canopy extension panel comprises;
   a first extension longitudinal water channel extending along a first longitudinal edge portion of the canopy extension panel and fluidly connected to the first main longitudinal water channel, the first extension longitudinal water channel comprising a termination end structured and operable to direct water to exit the first extension longitudinal water channel at a distal end of a sidewall of the first extension longitudinal water channel; and
   a second extension longitudinal water channel extending along a second longitudinal edge portion of the canopy extension panel and fluidly connected to the second main longitudinal water channel, the second extension longitudinal water channel comprising a termination end structured and operable to direct water to exit the second extension longitudinal water channel at a distal end of a sidewall of the second extension longitudinal water channel.

7. A canopy system for a lightweight vehicle, said canopy system comprising:
   a hollow front canopy downspout-strut comprising:
      a header comprising at least one water ingress opening in a connection face of the header such that the water ingress opening is fluidly connected with an internal lumen of the front canopy downspout-strut;
      a first downspout leg extending from a first end of the header and mountable to at least a first portion of a body of the vehicle such that a distal end of the first leg is directed away from a passenger compartment of the vehicle;
      a second downspout leg extending from a second end of the header and mountable to at least a second portion of a body of the vehicle such that a distal end of the second leg is directed away from the passenger compartment of the vehicle; and
   a canopy, the canopy comprising:
      a canopy main panel mountable to the front canopy downspout-strut, wherein the main panel comprises
         a first main longitudinal water channel extending along a first longitudinal edge portion of the canopy main panel;
         a second main longitudinal water channel extending along a second longitudinal edge portion of the canopy main panel;
         a forward lateral water channel extending along a forward lateral edge portion of the canopy main panel and integrally and fluidly connected to a forward end of the first main longitudinal water channel and a forward end of the second main longitudinal water channel;
         at least one water egress orifice formed in a bottom of an intermediate portion of the forward lateral water channel; and
         at least one spout extending from a perimeter of the at least one egress orifice, the at least one spout integrally formed with and extending from an underside of the canopy main panel, wherein the at least one spout is structured and operable to extend into the water ingress opening in the header of the front canopy downspout-strut of the vehicle when the canopy main panel is mounted to the front canopy downspout-strut such that water flowing through the forward lateral water channel will flow through the at least one water egress orifice and into the internal lumen of the front canopy downspout-strut header whereafter the water will through the first and second downspout legs and be discharged from the distal ends thereof.

8. The system of claim 7, wherein the main panel further comprises a passenger handle assembly, the passenger handle assembly comprising:
   at least one handle retention structure integrally formed with or connected to an underside of the canopy main panel; and
   a handle pivotally and retractably disposed and retained within the at least one handle retention structure.

9. The system of claim 7, wherein the main panel further comprises a rearward lateral water channel extending laterally along a rearward end portion of the canopy main panel and integrally and fluidly connected to a rearward end portion of the first main longitudinal water channel and a rearward end portion of the second main longitudinal water channel, the rearward lateral water channel structured and operable to direct water into the end portions of the first and second main longitudinal water channels, wherein the rearward end portions of the first and second main longitudinal water channels are open along a rearward edge of the canopy main panel such that water can exit the first and second main longitudinal water channels via the open end portions.

10. The system of claim 9, wherein the main panel further comprises a recessed extension connection section that extends from the rearward lateral water channel to a rearward end of the canopy main panel, the recessed extension connection section having a recessed top surface relative to a top surface of the canopy main panel extending forward of the rearward lateral water channel.

11. The system of claim 10, wherein the canopy further comprises a canopy extension panel connectable to the recessed extension connection section of the canopy main panel such that the rearward lateral water channel is disposed between the canopy extension panel and the canopy main panel, and a top surface of the canopy extension panel is coplanar with the top surface of the canopy main panel.

12. The system of claim 11 wherein the canopy extension panel comprises;
   a first extension longitudinal water channel extending along a first longitudinal edge portion of the canopy extension panel and fluidly connected to the first main longitudinal water channel, the first extension longitudinal water channel comprising a termination end structured and operable to direct water to exit the first extension longitudinal water channel at a distal end of a sidewall of the first extension longitudinal water channel; and
   a second extension longitudinal water channel extending along a second longitudinal edge portion of the canopy extension panel and fluidly connected to the second main longitudinal water channel, the second extension longitudinal water channel comprising a termination end structured and operable to direct water to exit the second extension longitudinal water channel at a distal end of a sidewall of the second extension longitudinal water channel.

13. The system of claim 7, wherein at least one of the header, the first downspout leg and the second downspout leg, comprises a dovetailed shaped accessory attachment channel, wherein each accessory attachment channel comprises:
   a mouth;
   a base having a width greater than a width of the mouth;
   a pair of opposing angled walls extending between the mouth and base; and
   an off-center wire duct recessed within the base such that a longitudinal center line of the wire duct is offset and non-coaxial with a longitudinal center line of the base, thereby defining a first base section and a second base section wherein the first base section is wider than the second base section such that the first base section provides a bolt stop that prevents a bolt threaded into a chamfered sided pinch nut disposable within the accessory attachment channel from extending into the wire duct.

14. The system of claim 7, wherein the canopy system further comprises at least one chamfered sided pinch nut, wherein the at least one chamfered sided pinch nut is structured and operable to bindingly engage the angled walls such that the at least one chamfered side pinch nut can be lodged within the accessory attachment channel.

15. A lightweight vehicle, said vehicle comprising:
   a chassis;
   a body mounted to the chassis;
   a passenger compartment supported by the chassis, the passenger compartment comprising:
      a dash console;
      a floorboard; and
      a passenger seating structure; and
   a canopy system mounted to the body and disposed above at least the passenger compartment, said canopy system comprising:
      a hollow front canopy downspout-strut comprising:
         a header comprising at least one water ingress opening in a connection face of the header such that the water ingress opening is fluidly connected with an internal lumen of the front canopy downspout-strut;
         a first downspout leg extending from a first end of the header and mountable to a first portion of the body such that a distal end of the first leg is directed away from the passenger compartment;
         a second downspout leg extending from a second end of the header and mountable to a second portion of a body such that a distal end of the second leg is directed away from the passenger compartment; and
      a canopy, the canopy comprising:
         a canopy main panel mountable to the front canopy downspout-strut, wherein the main panel comprises:
            a first main longitudinal water channel extending along a first longitudinal edge portion of the canopy main panel;
            a second main longitudinal water channel extending along a second longitudinal edge portion of the canopy main panel;
            a forward lateral water channel extending along a forward lateral edge portion of the canopy main panel and integrally and fluidly connected to a forward end of the first main longitudinal water channel and a forward end of the second main longitudinal water channel;
            at least one water egress orifice formed in a bottom of an intermediate portion of the forward lateral water channel; and
            at least one spout extending from a perimeter of the at least one egress orifice, the at least one spout integrally formed with and extending from an underside of the canopy main panel, wherein the at least one spout is structured and operable to extend into the water ingress opening in the header of the front canopy downspout-strut of the vehicle when the canopy main panel is mounted to the front canopy downspout-strut such that water flowing through the forward lateral water channel will flow through the at least one water egress orifice and into the internal lumen of the front canopy downspout-strut header whereafter the water will through the first and second downspout legs and be discharged from the distal ends thereof.

16. The vehicle of claim 15, wherein the main panel further comprises a passenger handle assembly, the passenger handle assembly comprising:
   at least one handle retention structure integrally formed with or connected to an underside of the canopy main panel; and
   a handle pivotally and retractably disposed and retained within the at least one handle retention structure.

17. The vehicle of claim 15, wherein the main panel further comprises a rearward lateral water channel extending laterally along a rearward end portion of the canopy main panel and integrally and fluidly connected to a rearward end portion of the first main longitudinal water channel and a rearward end portion of the second main longitudinal water channel, the rearward lateral water channel structured and operable to direct water into the end portions of the first and second main longitudinal water channels, wherein the rearward end portions of the first and second main longitudinal water channels are open along a rearward edge of the canopy main panel such that water can exit the first and second main longitudinal water channels via the open end portions.

18. The vehicle of claim 17, wherein the main panel further comprising a recessed extension connection section that extends rearward from the rearward lateral water channel to a rearward end of the canopy main panel, the recessed extension connection section having a recessed top surface relative to a top surface of the canopy main panel extending forward of the rearward lateral water channel.

19. The vehicle of claim 18, wherein the canopy further comprises a canopy extension panel connectable to the recessed extension connection section of the canopy main panel such that the rearward lateral water channel is disposed between the canopy extension panel and the canopy main panel, and a top surface of the canopy extension panel is coplanar with the top surface of the canopy main panel.

20. The vehicle of claim 19 wherein the canopy extension panel comprises;
  a first extension longitudinal water channel extending along a first longitudinal edge portion of the canopy extension panel and fluidly connected to the first main longitudinal water channel, the first extension longitudinal water channel comprising a termination end structured and operable to direct water to exit the first extension longitudinal water channel at a distal end of a sidewall of the first extension longitudinal water channel; and
  a second extension longitudinal water channel extending along a second longitudinal edge portion of the canopy extension panel and fluidly connected to the second main longitudinal water channel, the second extension longitudinal water channel comprising a termination end structured and operable to direct water to exit the second extension longitudinal water channel at a distal end of a sidewall of the second extension longitudinal water channel.

21. The vehicle of claim 17, wherein at least one of the header, the first downspout leg and the second downspout leg, comprises a dovetailed shaped accessory attachment channel, wherein each accessory attachment channel comprises:
  a mouth;
  a base having a width greater than a width of the mouth;
  a pair of opposing angled walls extending between the mouth and base; and
  an off-center wire duct recessed within the base such that a longitudinal center line of the wire duct is offset and non-coaxial with a longitudinal center line of the base, thereby defining a first base section and a second base section wherein the first base section is wider than the second base section such that the first base section provides a bolt stop that prevents a bolt threaded into a chamfered side pinch nut disposable within the accessory attachment channel from extending into the wire duct.

22. The vehicle of claim 17, wherein the canopy system further comprises at least one chamfered side pinch nut, wherein the at least one chamfered side pinch nut is structured and operable to bindingly engage the angled walls such that the at least one chamfered side pinch nut can be lodged within the accessory attachment channel.

* * * * *